US011280179B2

(12) United States Patent
Poe, Jr. et al.

(10) Patent No.: US 11,280,179 B2
(45) Date of Patent: Mar. 22, 2022

(54) EVALUATION OF PRESSURE-TRANSIENT BEHAVIOR OF WELLS

(71) Applicant: Schlumberger Technology Corporation, Sugar Land, TX (US)

(72) Inventors: Bobby Dale Poe, Jr., Houston, TX (US); Donald Hender, Newfoundland (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 220 days.

(21) Appl. No.: 16/481,046

(22) PCT Filed: Jan. 30, 2018

(86) PCT No.: PCT/US2018/015829
§ 371 (c)(1),
(2) Date: Jul. 25, 2019

(87) PCT Pub. No.: WO2018/140908
PCT Pub. Date: Aug. 2, 2018

(65) Prior Publication Data
US 2019/0390545 A1  Dec. 26, 2019

Related U.S. Application Data

(60) Provisional application No. 62/451,896, filed on Jan. 30, 2017.

(51) Int. Cl.
*E21B 47/10* (2012.01)
*E21B 49/00* (2006.01)
*G06F 17/14* (2006.01)

(52) U.S. Cl.
CPC ............ *E21B 47/10* (2013.01); *E21B 49/003* (2013.01); *G01V 2210/66* (2013.01); *G05B 2219/37536* (2013.01); *G06F 17/14* (2013.01)

(58) Field of Classification Search
None
See application file for complete search history.

(56) References Cited

U.S. PATENT DOCUMENTS 6,101,447 A * 8/2000 Poe, Jr. ................... E21B 49/00
702/13
2003/0220750 A1   11/2003 Delhomme et al.
(Continued)

FOREIGN PATENT DOCUMENTS

WO         2015/112211 A1     7/2015

OTHER PUBLICATIONS

Hewett, Thomas A. et al. "Theory for the semi-analytical calculation of oil recovery and effective relative permeabilities using stream tubes", Advances in Water Resources, vol. 20, Nos. 6-7, pp. 279-292 (Year: 1997).*

(Continued)

*Primary Examiner* — Kamini S Shah
*Assistant Examiner* — Russ Guill
(74) *Attorney, Agent, or Firm* — Michael Guthrie

(57) ABSTRACT

A method for monitoring movement of a fluid interface in a composite reservoir includes receiving data related to a composite reservoir. The composite reservoir includes an uninvaded oil zone, a water-invaded transition zone, and an aquifer. A model is generated using the data. The model is updated in response to movement of a fluid interface between the water-invaded transition zone and the uninvaded oil zone in the composite reservoir is identified. The model is also updated in response to movement of water from the aquifer toward the wellbore is also identified, before the fluid interface reaches a wellbore formed in the composite reservoir. A remedial action is determined to take in the wellbore in response to the movement of the fluid interface, the movement of the water, or both.

20 Claims, 30 Drawing Sheets

(56) References Cited

U.S. PATENT DOCUMENTS

| | | | |
|---|---|---|---|
| 2014/0083687 A1* | 3/2014 | Poe | E21B 43/26 |
| | | | 166/250.1 |
| 2014/0251622 A1 | 9/2014 | Coates | |
| 2015/0204174 A1* | 7/2015 | Kresse | E21B 43/26 |
| | | | 166/250.01 |
| 2016/0025894 A1 | 1/2016 | Abou-Sayed et al. | |
| 2018/0066515 A1* | 3/2018 | Balan | E21B 34/06 |

OTHER PUBLICATIONS

Escobar, Freddy-Humberto et al. "Pressure and pressure derivative analysis for a three-region composite reservoir", ARPN Journal of Engineering and Applied Sciences, vol. 7 No. 10 (Year: 2012).*

Bailey, Bill, et al. "Water control." Oilfield review 12.1, pp. 30-51 (Year: 2000).*

IHS Markit, "Analytical Models Analysis Theory", https://web.archive.org/web/20160310120632/http://www.fekete.com/san/webhelp/feketeharmony/harmony_webhelp/content/html_files/reference_material/analysis_method_theory/analytical_models_theory.htm (Year: 2016).*

McLean, Katie et al. "Applying the Pressure Derivative Method to Identify Geothermal Well Responses", Proceedings 36th New Zealand Geothermal Workshop (Year: 2014).*

Hewett,Thomas A. et al., "Theory for the semi-analytical calculation of oil recovery and effective relative permeabilities using stream tubes", 1997, Advances in Water Resources, vol. 20, Nos. 5-6, pp. 279-292 (Year: 1997).*

Alrumah, et al., "Estimating Distance to Water Front for Edge Water Using Derivative of Pressure Transient Data," International Journal of Oil, Gas, and Coal Technology, vol. 11, No. 1, (2016).

Buckley, et al., "Mechanism of Fluid Displacement in Sands," Transactions of the AIME (1942) vol. 146, Issue 1, pp. 107-116.

Cinco-Ley, et al., "Use and Misuse of the Superposition Time Function in Well Test Analysis," paper SPE 19817 presented at the 64th Annual Technical Conference and Exibition, San Antonio, TX, Oct. 8-11, 1989.

El-Khatib, "Transient Pressure Behavior of Composite Reservoirs with Moving Boundaries," paper SPE 53153 presented at the 1999 SPE Middle East Oil Show, Bahrain, Feb. 20-23, 1999.

Habte, "Laplace-transform Finite-Difference and Quasistationary Solution Method fir Water-Injection/Falloff Tests," SPE 168221; SPE Journal, vol. 19, No. 3, Jun. 1, 2014.

Moridis, et al., "The Laplace Transform Finite Difference (LTFD) Numerical Method for the Simulation of Compressible Liquid Flow in Reservoirs," SPE 22888; SPE Advanced Technology Series, vol. 2, No. 2, pp. 122-131.

Rodriguez-N, et al., "A Variable Block Size Model for the Characterization of Naturally Fractured Reservoirs," paper SPE 71570 presented at the 2001 Annual Technical Conference and Exbition, New Orleans, LA, Sep. 30-Oct. 3, 2001.

International Search Report and Written Opinion for the equivalent International patent application PCT/US2018/015829 dated May 14, 2018.

Extended European Search Report dated Jul. 24, 2020 in corresponding European Patent Application No. 18744708.1, 6 pages.

International Preliminary Report on Patentability for the equivalent International patent application PCT/US2018/015829 dated Aug. 8, 2019.

* cited by examiner

EVALUATION OF PRESSURE-TRANSIENT BEHAVIOR OF WELLS

CROSS-REFERENCE TO RELATED APPLICATIONS

This application claims priority to U.S. Provisional Patent Application No. 62/451,896, which was filed on Jan. 30, 2017, the entirety of which is incorporated by reference herein.

BACKGROUND

Technology exists concerning the development of models for the pressure-transient behavior and the fluid front spatial position of a composite reservoir with a moving fluid front interface. A study of these technologies considered the pressure-transient behavior of a radial composite system with a moving fluid interface between an uninvaded oil zone and a transition zone in which the movable oil was displaced by water from a connected aquifer. That investigation utilized empirical models for the relative permeability relationships as well as the Laplace Transform Finite-Difference (LTFD) numerical technique for evaluating the spatial derivatives of the moving boundary problem.

Another study employed the Laplace Transform Finite-Difference numerical methodology to develop a model for evaluating the injection and falloff pressure-transient behavior of an unfractured water-injection well in a radial composite system with movement between the injected fluid and uninvaded reservoir regions. The Laplace Transform Finite-Difference numerical technique has also been used in developing a pressure-transient model for evaluating the pressure-derivative function behavior of a vertical well in a composite reservoir with a moving fluid front to estimate the position of the fluid interface in a composite reservoir.

SUMMARY

A method for monitoring movement of a fluid interface in a composite reservoir is disclosed. The method includes receiving data related to a composite reservoir. The composite reservoir includes an uninvaded oil zone, a water-invaded transition zone, and an aquifer. A model is generated using the data. The model is updated in response to movement of a fluid interface between the water-invaded transition zone and the uninvaded oil zone in the composite reservoir is identified. The model is also updated in response to movement of water from the aquifer toward the wellbore is also identified, before the fluid interface reaches a wellbore formed in the composite reservoir. A remedial action is determined to take in the wellbore in response to the movement of the fluid interface, the movement of the water, or both.

A computing system is also disclosed. The computing system includes a processor and a memory system including a non-transitory computer-readable medium storing instructions that, when executed by the processor, cause the computer system to perform operations. The operations include receiving data related to a composite reservoir. The composite reservoir includes an uninvaded oil zone, a water-invaded transition zone, and an aquifer. A model is generated using the data. The model is updated in response to movement of a fluid interface between the water-invaded transition zone and the uninvaded oil zone in the composite reservoir is identified. The model is also updated in response to movement of water from the aquifer toward the wellbore is also identified, before the fluid interface reaches a wellbore formed in the composite reservoir. A remedial action is determined to take in the wellbore in response to the movement of the fluid interface, the movement of the water, or both.

A non-transitory computer-readable media is also disclosed. The media stores instructions that, when executed by a processor of a computer system, cause the computer system to perform operations. The operations include receiving data related to a composite reservoir. The composite reservoir includes an uninvaded oil zone, a water-invaded transition zone, and an aquifer. A model is generated using the data. The model is updated in response to movement of a fluid interface between the water-invaded transition zone and the uninvaded oil zone in the composite reservoir is identified. The model is also updated in response to movement of water from the aquifer toward the wellbore is also identified, before the fluid interface reaches a wellbore formed in the composite reservoir. A remedial action is determined to take in the wellbore in response to the movement of the fluid interface, the movement of the water, or both.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 3A illustrates relative permeability laboratory data, and FIG. 3B illustrates relative permeability ratio analysis, according to an embodiment

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
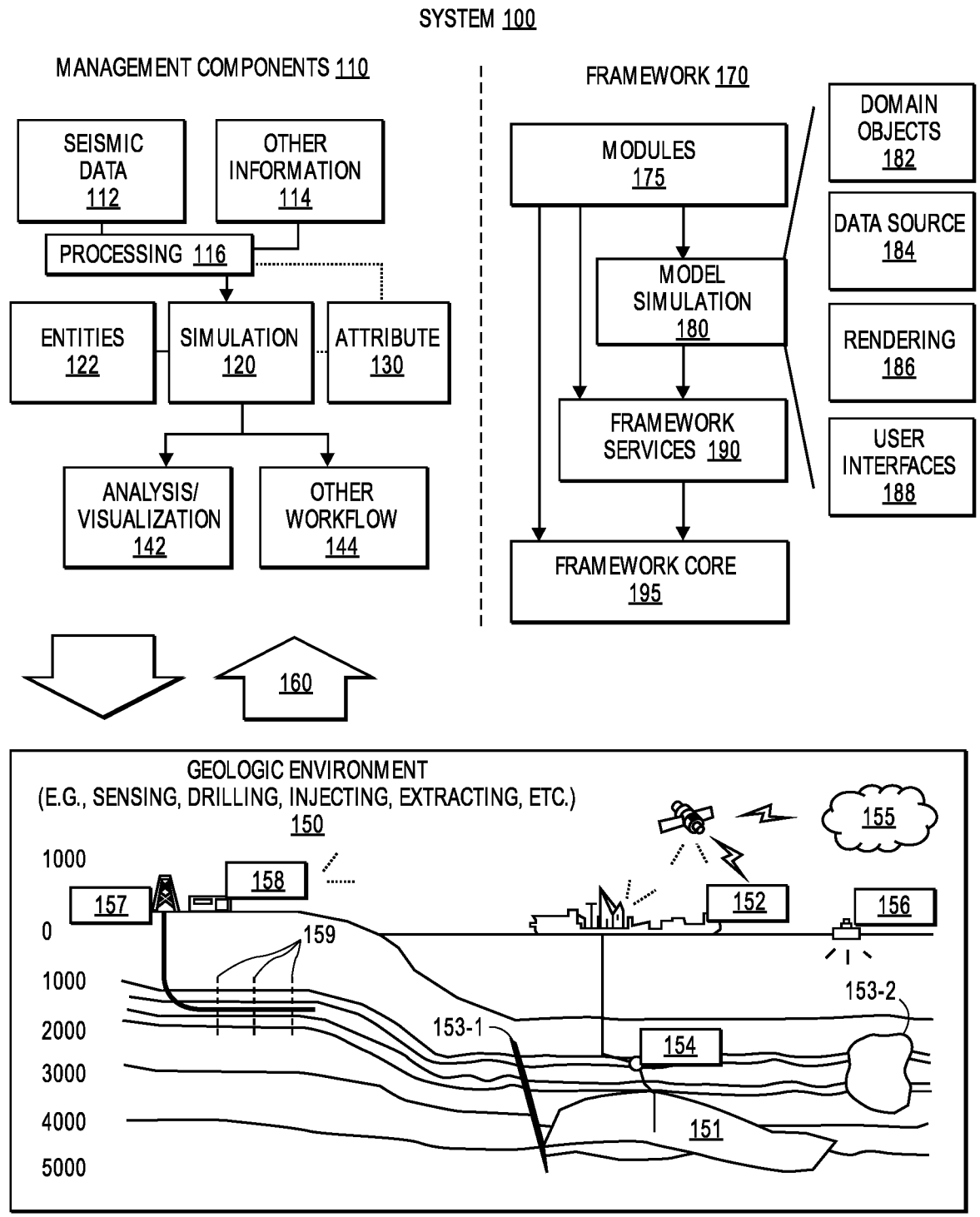
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Pressure-transient models are presented for evaluating the behavior of vertical, vertically-fractured, and horizontal wells in radial and linear (e.g., three-region) composite reservoirs with moving fluid fronts. The Laplace transform finite difference numerical solution methodology combined with the well-known Buckley-Leverett frontal-advance equation have been used to develop solutions for the moving boundary problem. Hybrid semi-analytic and numerical solutions have been constructed for finite-conductivity vertical fractures and infinite-conductivity horizontal wellbores. Descriptions of the mathematical models are described herein, including the pressure-transient solutions, frontal position and velocity, and saturation distributions. Indications are that monitoring the transient behavior allows for detecting of water encroachment in a producing well prior to breakthrough, which enables a user to make proactive modifications in the production operations to delay breakthrough. The modifications may include reducing or ceasing production (e.g., of hydrocarbon fluids) of the completed interval of the wellbore that has been identified to have water encroachment. The production may be ceased in one or more of the following ways: squeeze cementing in the wellbore, polymer injection or chemical treatment in the wellbore, closing a sliding sleeve in the wellbore, and/or setting a plug in the wellbore to isolate that interval from the rest of the completed intervals in the wellbore.

The results of the pressure-transient models presented may be compared with the available moving boundary radial composite solutions. Furthermore, the results of the vertically-fractured and horizontal well solutions have been validated using analytic and numerical reservoir simulation. Six well and reservoir model combinations are described below for which oilfield applications exist for each composite system considered. These well and reservoir models include solutions of the pressure-transient behavior of an unfractured vertical well in a radial composite reservoir, a vertically-fractured well in linear and radial composite systems, a horizontal well in radial and linear composite systems, and a vertical fracture intersected by a horizontal well in a linear composite system. An extension of the solution methodology for evaluating the pressure-transient behavior of a selectively completed horizontal wellbore in a cylindrical composite reservoir has also been considered. Each of these solutions include moving fluid fronts, whose position and velocity are determined from the frontal advance model and fractional flow theory. General fractional flow solutions have been implemented that utilize conventional laboratory relative permeability measurements.

The present disclosure develops a numerical model for the analysis of the pressure or rate-transient response behavior of a well located in a composite reservoir including an uninvaded oil zone, a water-invaded transition zone, and an active aquifer in which the fluid interfaces position between the uninvaded oil zone and the transition region is permitted to vary with production time. The types of producing wells that have been considered in the development of this new production monitoring methodology were unfractured vertical wells, finite and infinite-conductivity vertically-fractured wells intersected by vertical and horizontal wellbores, and horizontal wellbores. The results obtained with the computational model and other specialized diagnostic analyses provide the ability to develop interpretation techniques for identifying the movement of the fluid interfaces in the reservoir, and the encroachment of water from the aquifer to the producing well before the fluid front reaches the producing well.

Both radial and linear reservoir fluid flow solutions have been developed for these well and reservoir configurations. The external boundaries of the aquifer and the uninvaded oil zone are considered to be cylindrical or rectangular in shape. The external boundaries of the system may be either of a no-flow or constant pressure boundary condition. The Buckley and Leverett (BL) fractional flow theory has been used to describe the frontal advance of the oil-water system and a general fractional flow model has been implemented in the analysis with parameters calibrated using laboratory measurements of oil-water relative permeability values.

Figure 2:
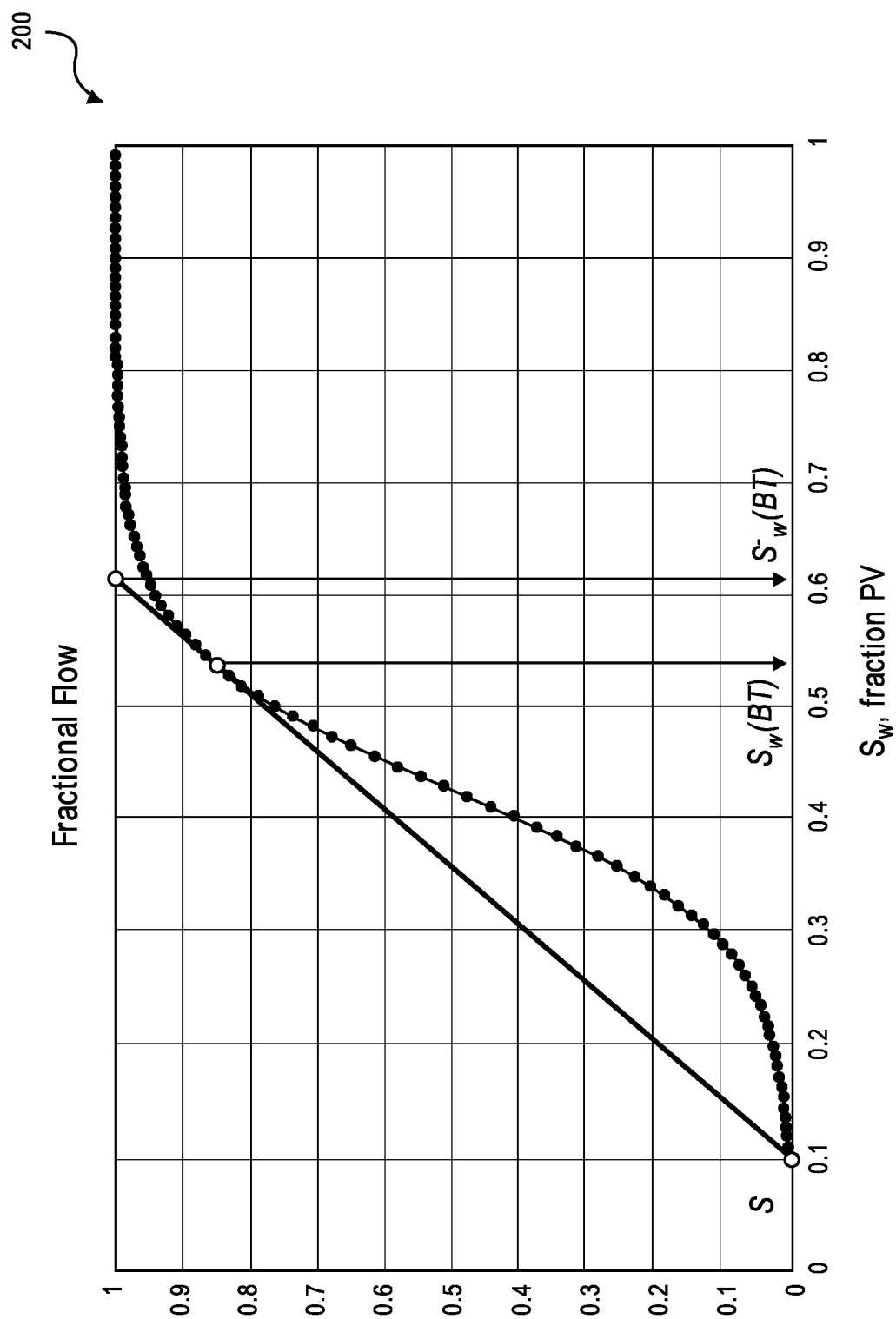
FIG. 2 illustrates a graph showing the application of a frontal advance model, according to an embodiment.
Figure 3A:
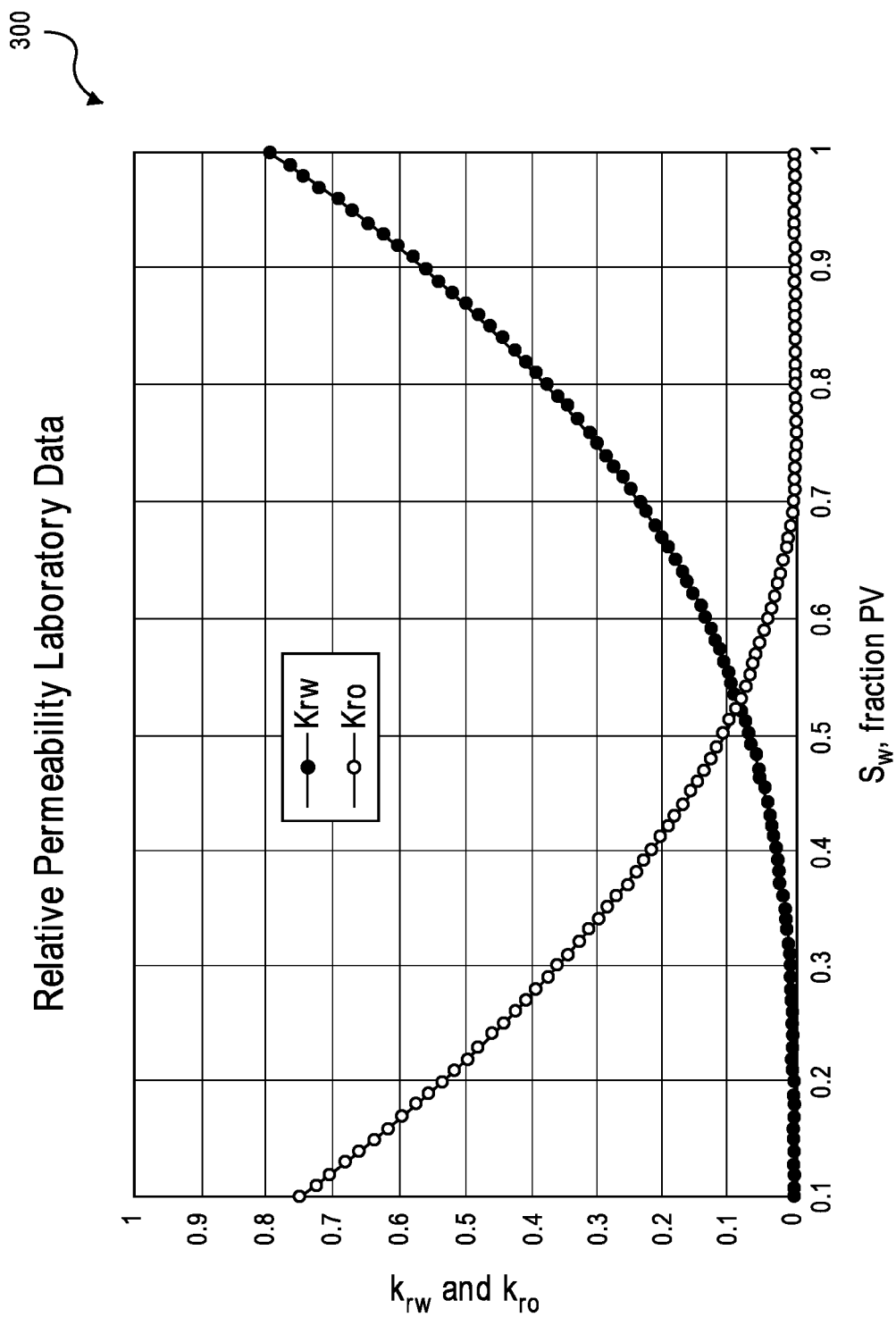
FIGS. 3A and 3B illustrate a depiction of a calibration of fractional flow model parameters based on relative permeability data. More particularly.
Figure 3B:
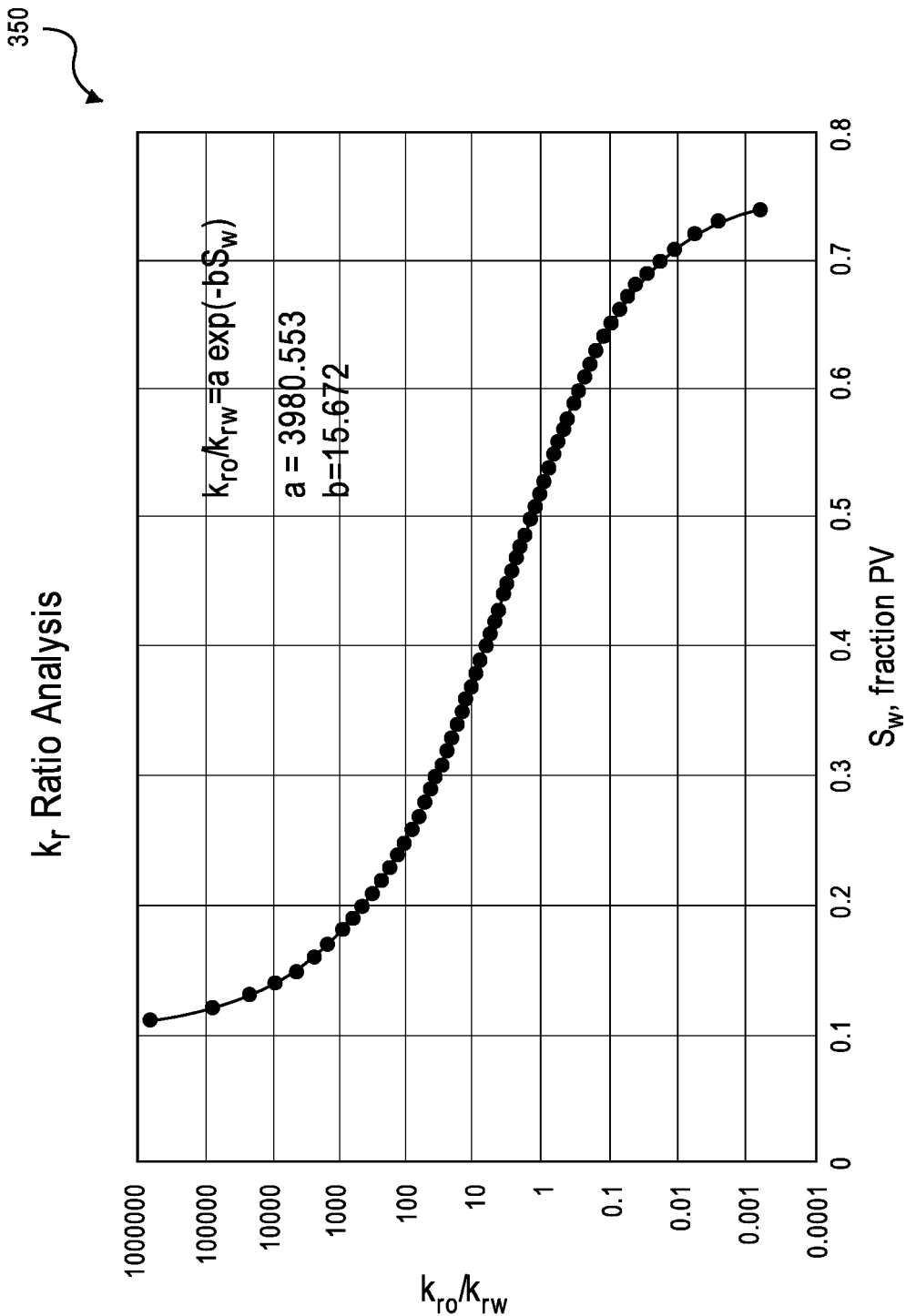

FIG. 2 illustrates a graph 200 showing the application of a frontal advance model, according to an embodiment. FIGS. 3A and 3B illustrate the corresponding depiction of the calibration of the fractional flow model parameters based on relative permeability data. More particularly, FIG. 3A illustrates a graph 300 showing relative permeability laboratory data, and FIG. 3B illustrates a graph 350 showing relative permeability ratio analysis. The tangent construction method is used to estimate water saturation.

Implementing of the general fractional flow model in the model development may help to automate the calibration technique for the relative permeability functions using the laboratory measurements. The general fractional flow model was used for the reservoir and well types considered, including vertically-fractured and horizontal wells, and even for radial flow analyses of unfractured vertical wells.

Figure 4:
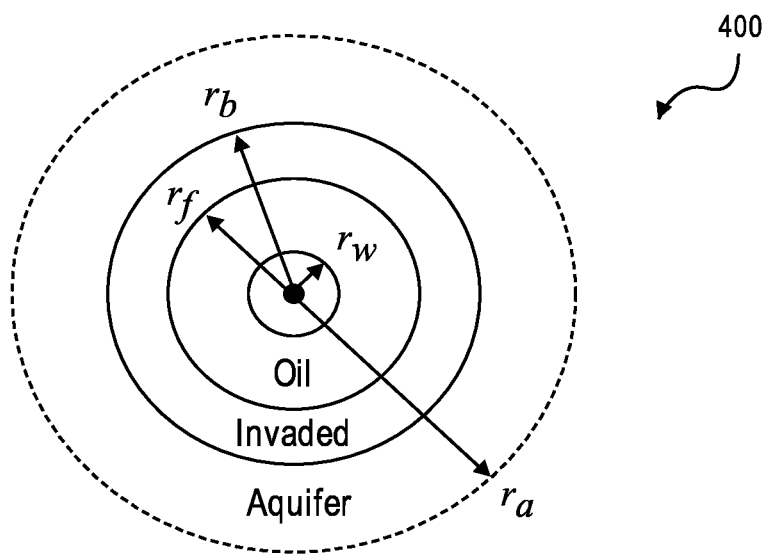
FIG. 4 illustrates a schematic view of fully-penetrating unfractured vertical wells in radial composite systems, according to an embodiment.
Figure 5:
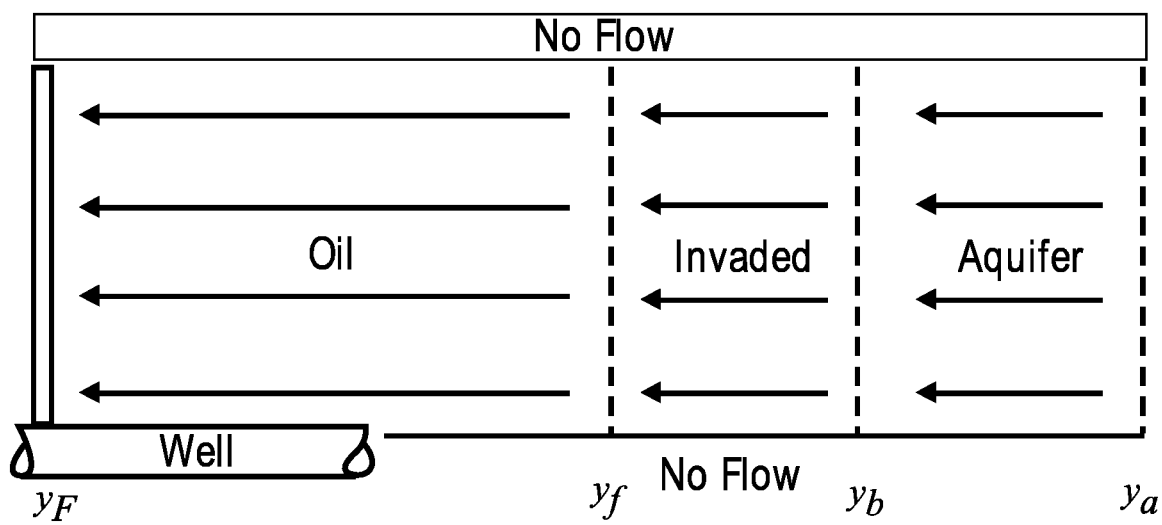
FIG. 5 illustrates a schematic view of linear flow to a vertical fracture intersected by a horizontal well, according to an embodiment.
Figure 6:
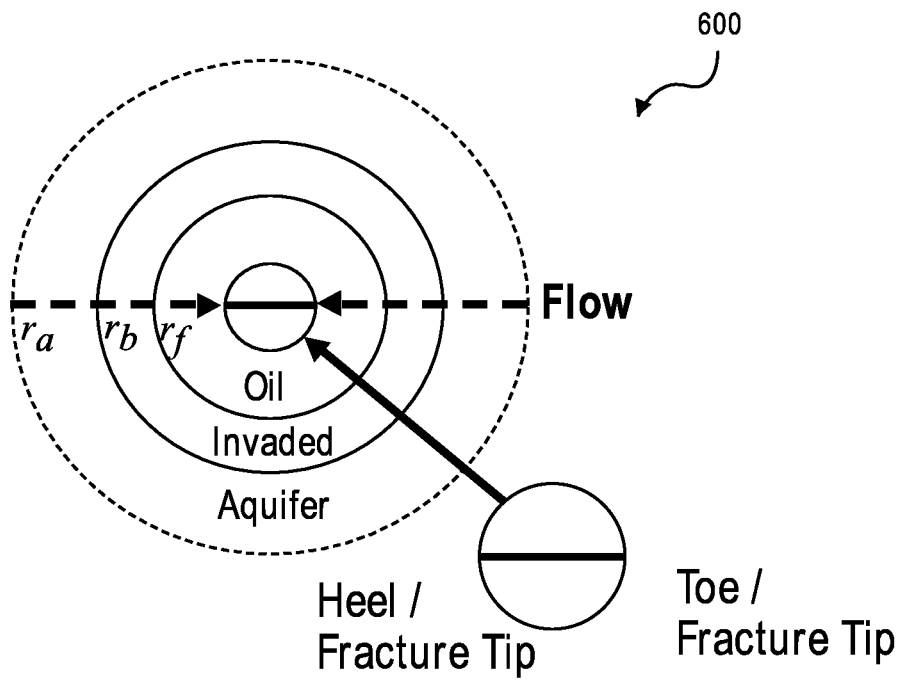
FIG. 6 illustrates radial flow to vertical fractures or horizontal wellbores in cylindrical composite systems, according to an embodiment.

The spatial configuration of some of the composite reservoir systems are shown in FIGS. 4-6. More particularly, FIG. 4 illustrates a schematic view 400 of fully-penetrating unfractured vertical wells in radial composite systems, according to an embodiment. FIG. 5 illustrates a schematic view 500 of linear flow to a vertical fracture intersected by a horizontal well, according to an embodiment. FIG. 6 illustrates a schematic view 600 of radial flow to vertical fractures or horizontal wellbores in radial composite systems, according to an embodiment. Linear flow to a vertical fracture intersected by a vertical well or reservoir linear flow to a horizontal drainhole are also analogous to that presented in FIG. 5.

Figure 7:
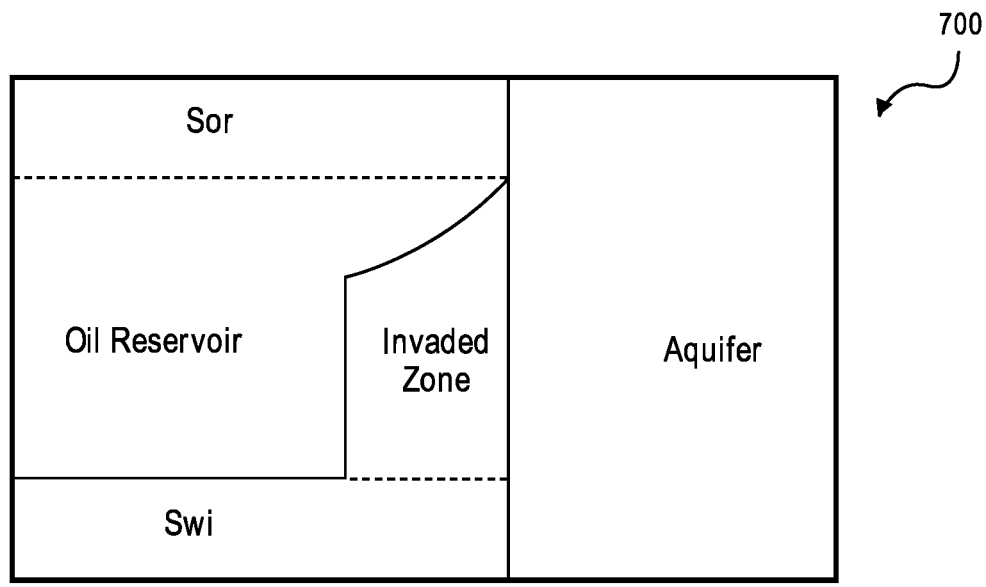
FIG. 7 illustrates a schematic view of fluid distribution in a water-drive oil reservoir, according to an embodiment.

The single-layer reservoir is schematically illustrated by an assembly of two or more distinct homogeneous, isotropic regions (e.g., impermeable at top and bottom) of constant and uniform thickness. Adjacent regions are assumed to be hydraulically-communicating along an interface or front with pressure and flux continuity. The diffusivity fluid flow equation is obeyed in each region for a prescribed set of constraints (e.g., dependent on the well-reservoir geometry), representing mass conservation of slightly compressible fluids flowing through porous media according to Darcy's law. Gravity, capillary, and non-isothermal effects are neglected. Furthermore, the reservoir fluid potential is a function of pressure. The formation may be filled with slightly-compressible fluids (e.g., water and oil). Isothermal reservoir conditions are assumed, and the reservoir is assumed to be above the bubblepoint pressure to ensure that no free gas is present in the system. A centralized well is producing at a constant flow rate while undergoing reservoir edgewater drive (e.g., it areally encircles or exclusively feeds one side or flank), forming immiscible fluid banks due to water influx entering the reservoir in the radial or lateral direction. Aquifer expansion replaces the extracted fluids that are produced via the well. Mobilities are continuously changing in the water-invaded zone as a result of an established saturation gradient, as shown in FIG. 7, which illustrates a schematic view 700 of fluid distribution in a water-drive oil reservoir. Furthermore, two-phase (e.g., water and oil) flow is governed by relative permeabilities. It may also be assumed that the fluid compressibilities do not substantially affect the saturation distributions. Therefore, the saturation and pressure may be decoupled, and the frontal advance theory of Buckley and Leverett may be applied to generate the saturation profile as well as determine the location of the water-oil fluid bank. Because capillary effects were omitted, the equations used to determine the water fractional flow are the same irrespective of the system being linear or radial. After determining the saturation profile at a given time, the mobility and storativity terms may be computed within the invaded zone at discrete points on a logarithmic grid (denoted by $r_i=1, 2, \ldots, N_r$ or $y_i=1, 2, \ldots, N_y$ for the radial or linear cases). The solution combines the Laplace transform finite difference method with the BL-frontal advance model when solving the diffusivity equation.

Mathematical Model Validation

The solution of the Laplace transform finite difference numerical model for a composite well-reservoir undergoing radial or lateral edgewater drive is validated below. For radial flow geometry, the work conducted for a fully-penetrating non-fractured vertical well is referenced. That investigation studied the effects of reservoir size, aquifer size, production rate, mobility ratio, skin, and well-bore storage. FIGS. 8-11 are solution examples generated by the model disclosed herein, using estimated representative fluid properties. The pressure-transient response at the well was evaluated and the distance to the fluid front was sought.

Figure 8:
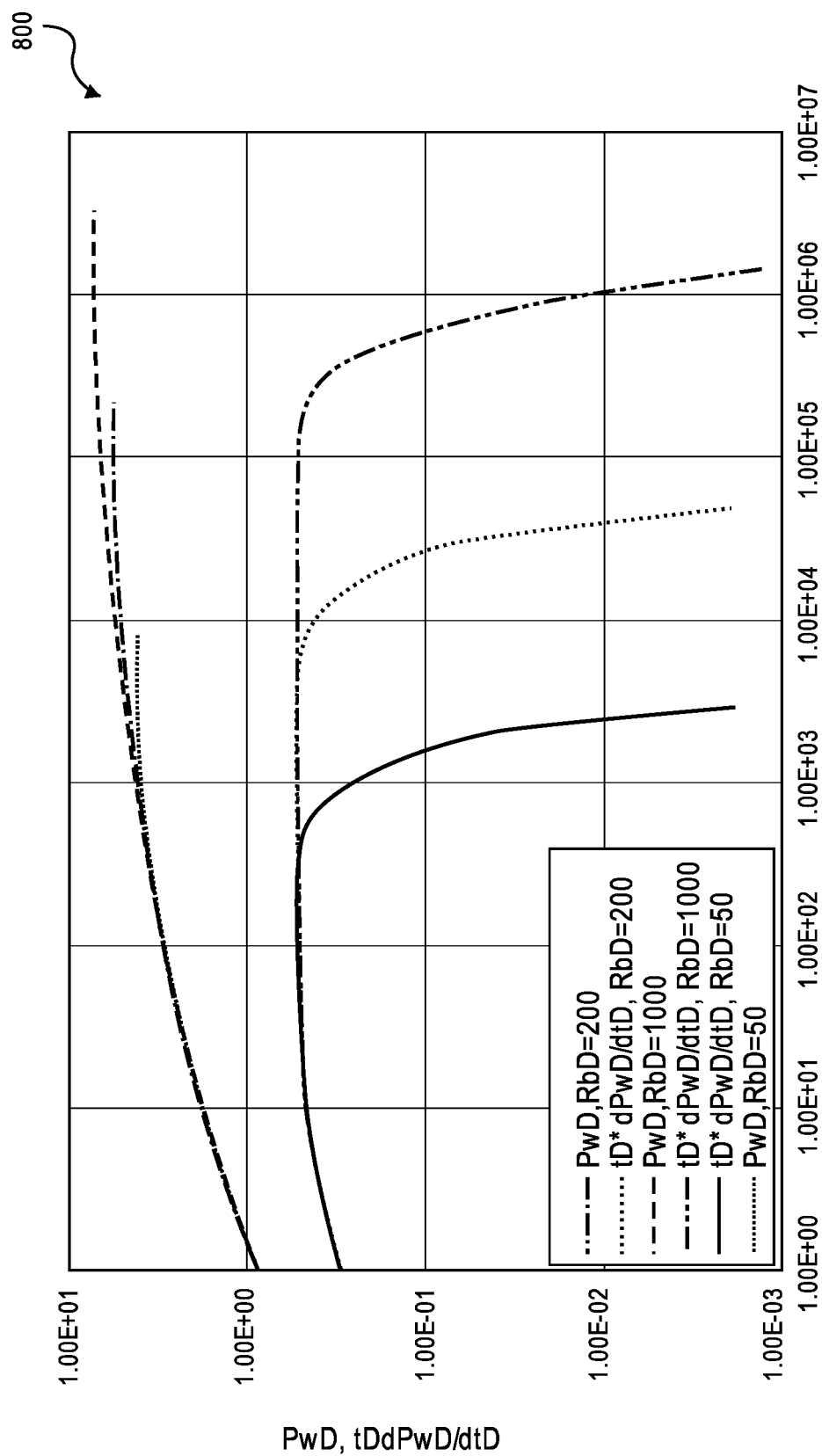
FIG. 8 illustrates a graph showing the effects of the reservoir size on a dimensionless pressure and pressure derivative, according to an embodiment.
Figure 9:
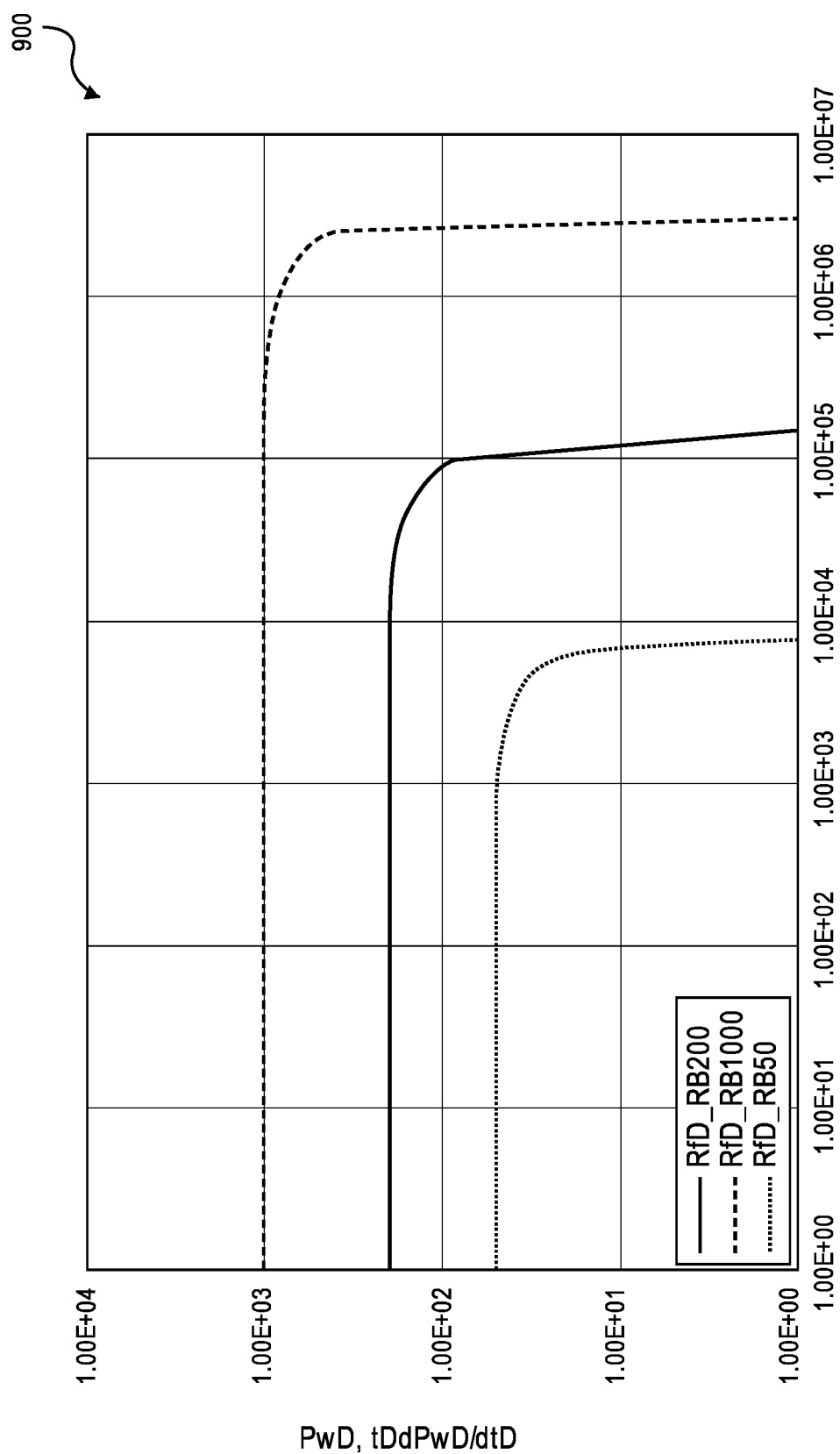
FIG. 9 illustrates a graph showing the location of a water-oil interface for different reservoir sizes, according to an embodiment.
Figure 10:
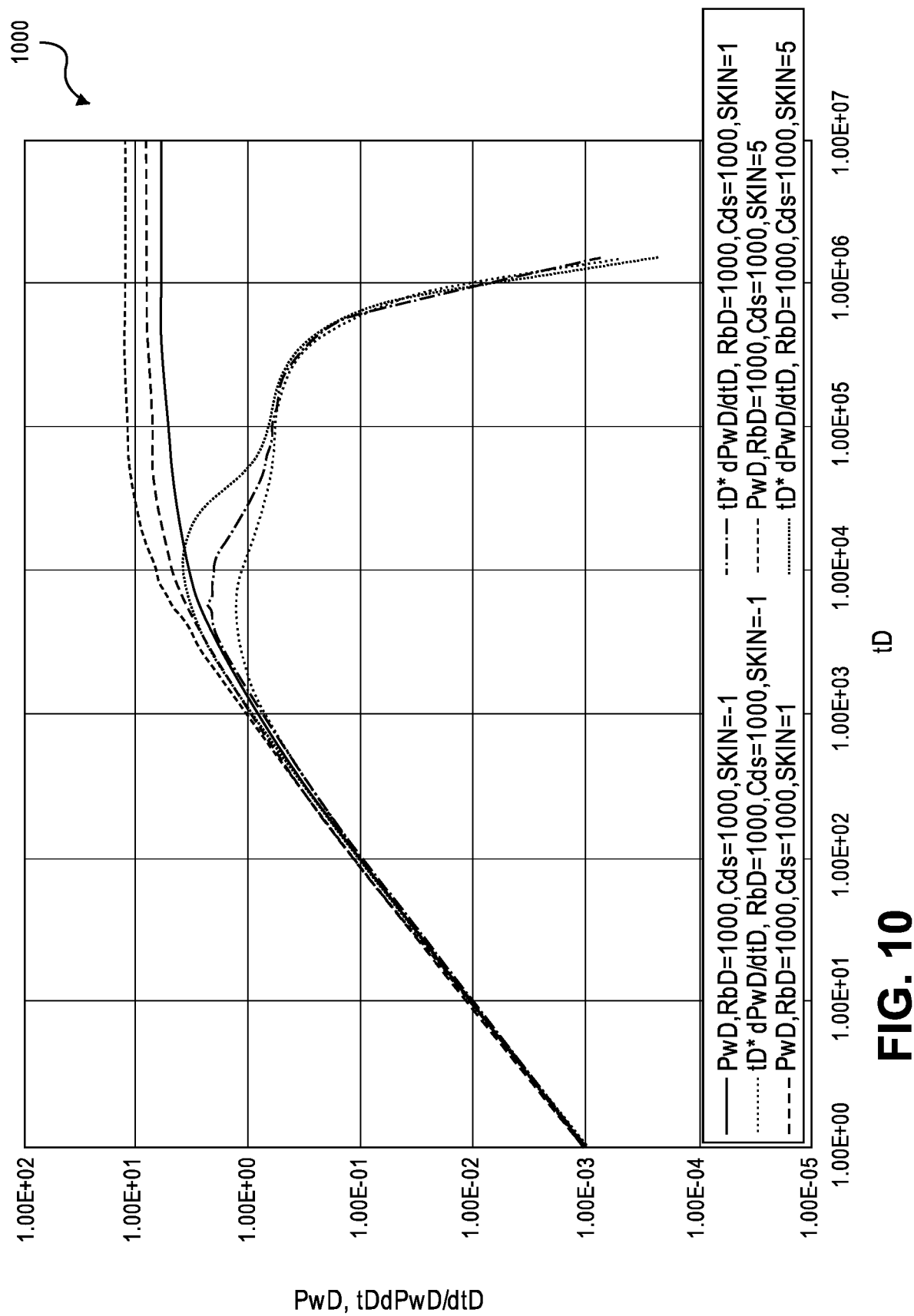
FIG. 10 illustrates a graph showing the skin effect on dimensionless pressure and pressure derivative, according to an embodiment.
Figure 11:
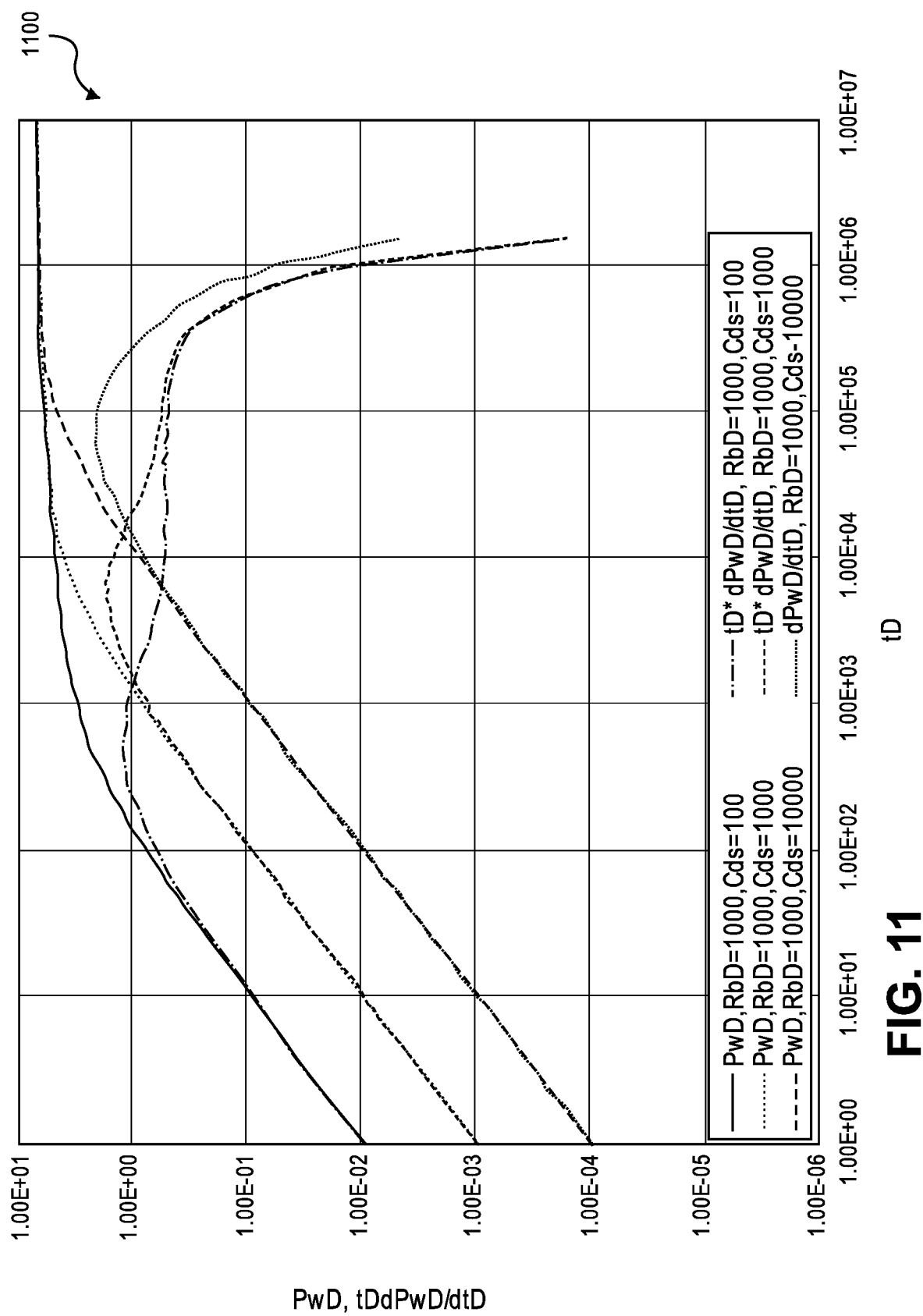
FIG. 11 illustrates a graph showing the wellbore storage effect on dimensionless pressure and pressure derivative, according to an embodiment.

FIG. 8 illustrates a graph 800 showing the effects of the reservoir size ($r_{bD}$=50, 200, and 1000) on a dimensionless pressure and pressure derivative, according to an embodiment. When the reservoir is small, the effect of the nonstationary oil-water interface will be felt earlier in comparison to larger reservoirs. FIG. 9 illustrates a graph 900 showing the location of a water-oil interface for different reservoir sizes, according to an embodiment. The position of the oil-water fluid interface or front as a function of dimensionless time for reservoir sizes shown in FIG. 9 corresponds to those noted in FIG. 8. Because the velocity of the interface or front is inversely proportional to the radius, movement of this interface or front progresses very slowly during the early times due to the geometry of the system where water is travelling from a larger zone to smaller zone. FIG. 10 illustrates a graph 1000 showing the skin effect on dimensionless pressure and pressure derivative, according to an embodiment. FIG. 11 illustrates a graph 1100 showing the wellbore storage effect on dimensionless pressure and pressure derivative, according to an embodiment. The influence of the skin effect and wellbore storage effects are apparent in the results of the pressure derivative response as expected. In the absence of the wellbore storage effect, the skin effect does not influence the pressure derivative response, and, consequently, it changes the value of pressure by the skin factor (S). In another embodiment, when wellbore storage effects are present, the skin effect is proportional to the sandface flow rate. FIG. 10 shows how this behavior is reflected on the curve shapes.

Figure 12:
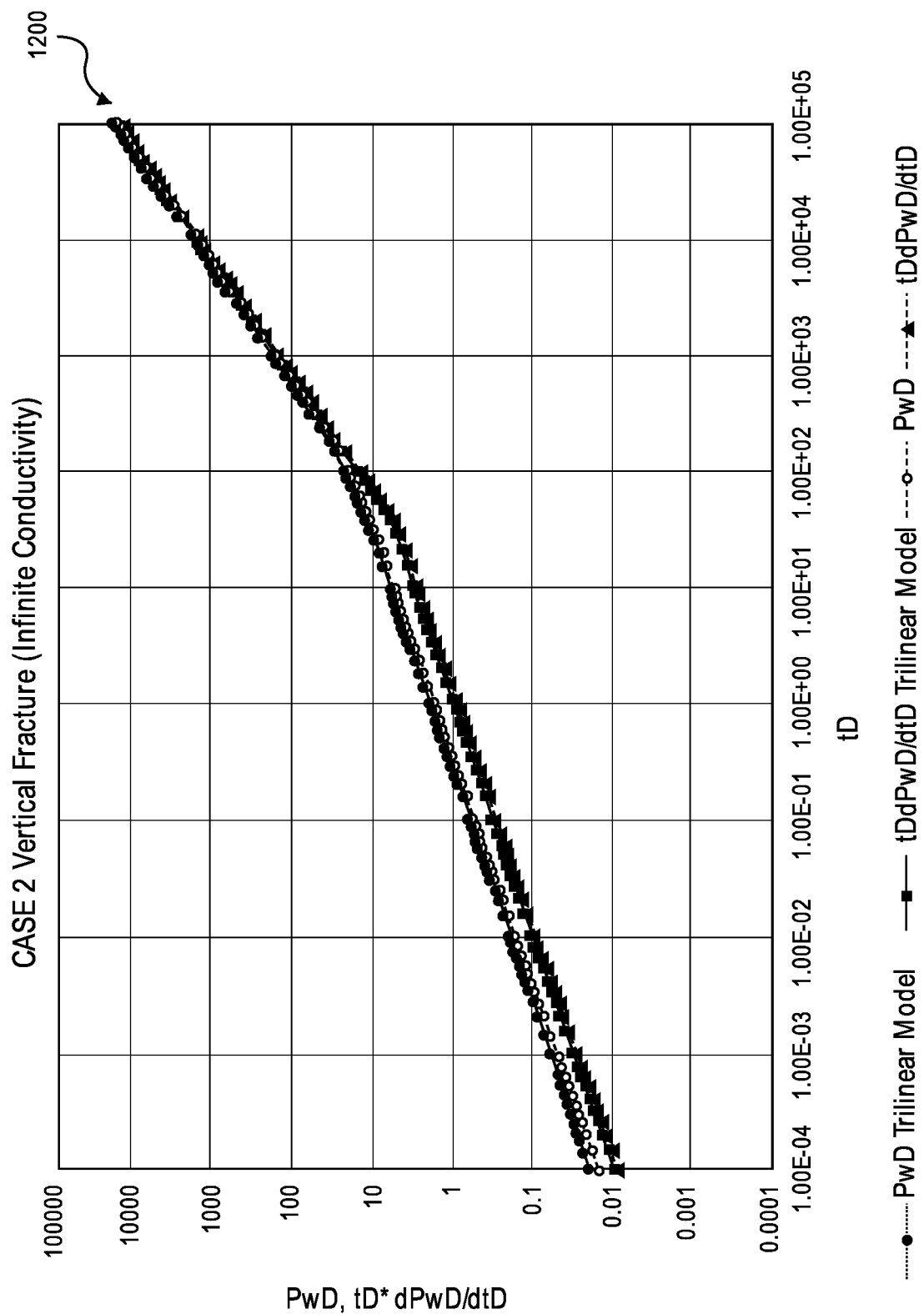
FIG. 12 illustrates a graph showing dimensionless pressure and pressure derivative compared with a trilinear solution for an infinite conductivity vertical planar fracture, according to an embodiment.
Figure 13:
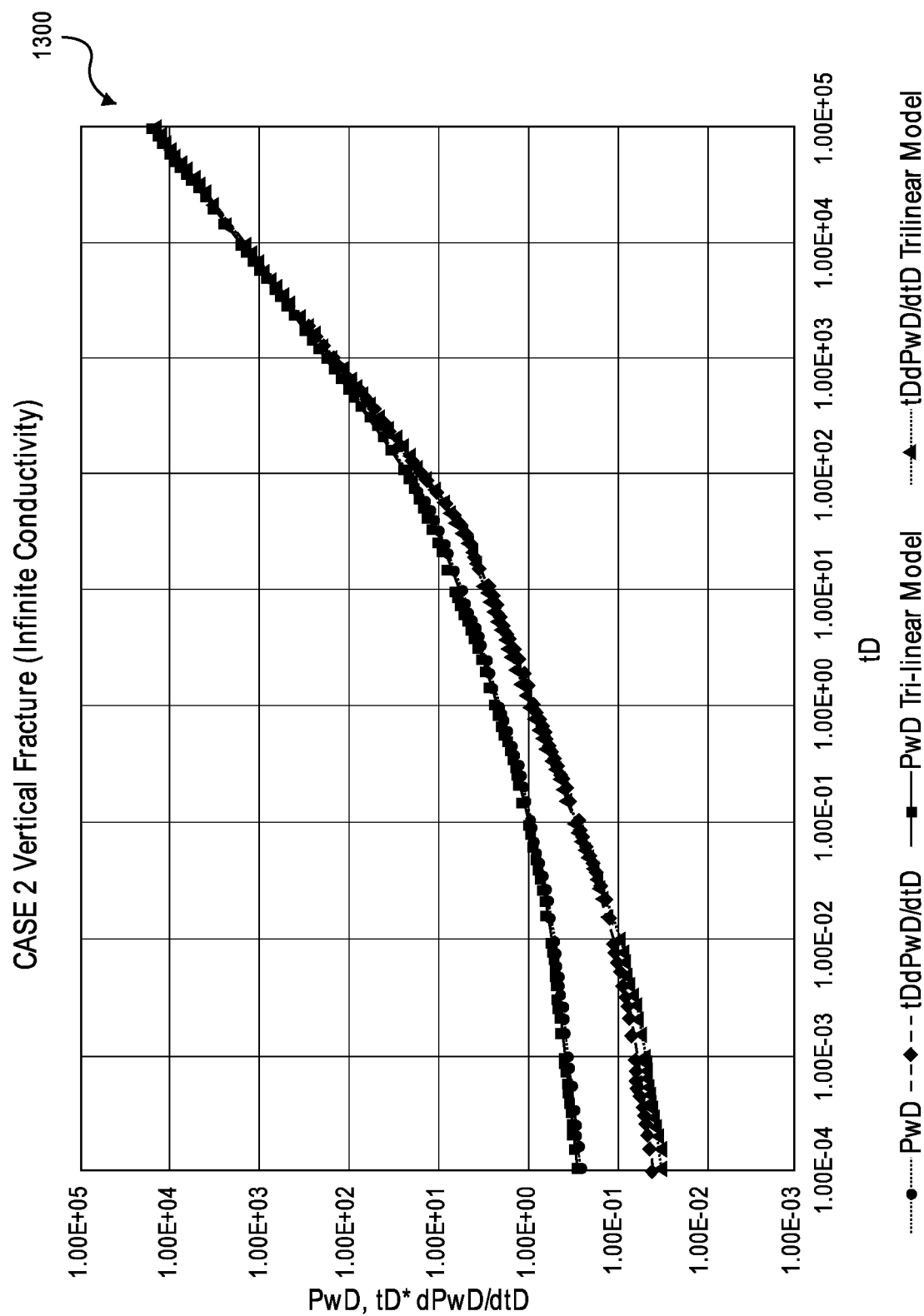
FIG. 13 illustrates a graph showing dimensionless pressure and pressure derivative compared with a trilinear solution for a finite conductivity vertical planar fracture, according to an embodiment.

FIG. 12 illustrates a graph 1200 showing a dimensionless pressure and pressure derivative compared with a trilinear solution for an infinite conductivity vertical planar fracture, according to an embodiment. FIG. 13 illustrates a graph 1300 showing a dimensionless pressure and pressure derivative compared with a trilinear solution for a finite conductivity vertical planar fracture, according to an embodiment. In the case of linear flow geometry, two examples of flow towards a planar vertically-fractured well are selected, with infinite-conductivity and finite-conductivity fractures. The results were obtained by comparing the dimensionless pressure and pressure derivative function signatures from the model generated herein versus finite-difference simulation results and those from a trilinear analytic model, with stationary boundaries as shown in FIGS. 12 and 13.

Figure 14:
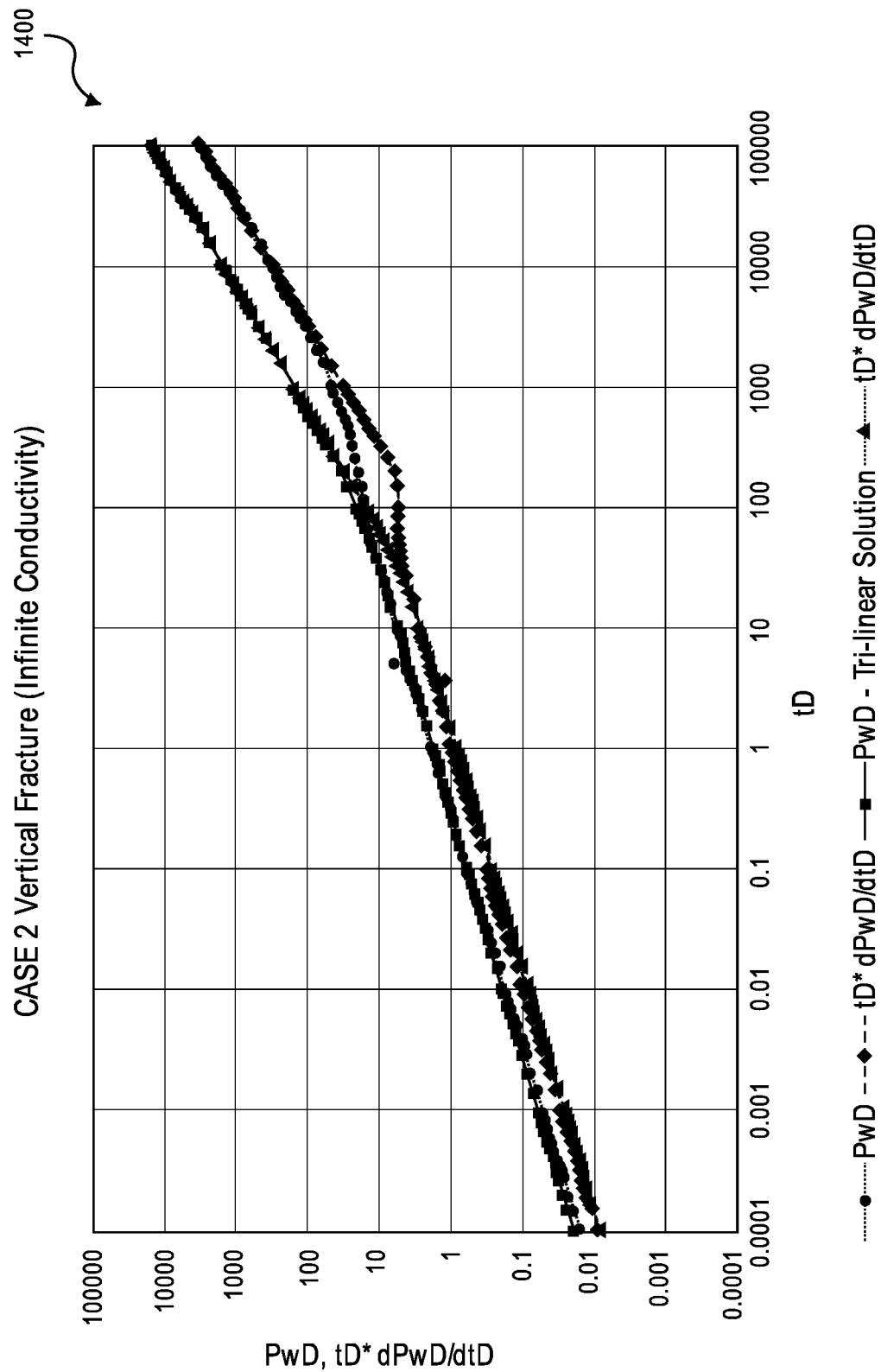
FIG. 14 illustrates a graph showing dimensionless pressure and pressure derivative comparison with the trilinear solution for an infinite conductivity vertical planar fracture with the outer boundary locations at a predetermined (e.g., large) distance apart, according to an embodiment.

FIG. 14 illustrates a graph 1400 showing a dimensionless pressure and pressure derivative comparison with the trilinear solution for an infinite conductivity vertical planar fracture with the outer boundary locations at a predetermined (e.g., large) distance apart, according to an embodiment. For this comparative analysis with the analytic model of the pressure-transient behavior of a single vertical fracture, the fluid interface or front location ($Y_f$) was fixed and the reservoir outer-boundary location ($Y_b$) was set close to (almost equal) the aquifer boundary ($Y_a$) location. If the outer boundaries are placed at a predetermined (e.g., large) separation distance, the unit slope (i.e., boundary flow) behavior occurs after the fixed dimension trilinear solution, as shown by the results in FIG. 14. Intuitively, a user might anticipate that the moving boundary solution should begin its unit slope behavior before the fixed boundary solution. If the reservoir physical boundary (at $Y_b$) was a no-flow boundary condition and advanced toward the fracture during production, the late time behavior (unit slope) would occur sooner than if reservoir dimensions were fixed at the initial position of the reservoir boundary ($Y_b$). However, because the fluid interface or front location ($Y_f$) is not a no-flow boundary condition, then the behavior observed in FIG. 14 results. In other words, the response observed is more like a constant pressure boundary effect (or at least a delayed Neuman outer-boundary condition effect). As previously highlighted, moving the reservoir outer-boundary position ($Y_b$) nearer (almost equal) to the aquifer boundary ($Y_a$) reduces a large pressure support reservoir volume, and instead behaves more similarly to that of a no-flow outer-boundary condition at the reservoir boundary as given in the trilinear model.

Results

Figure 15:
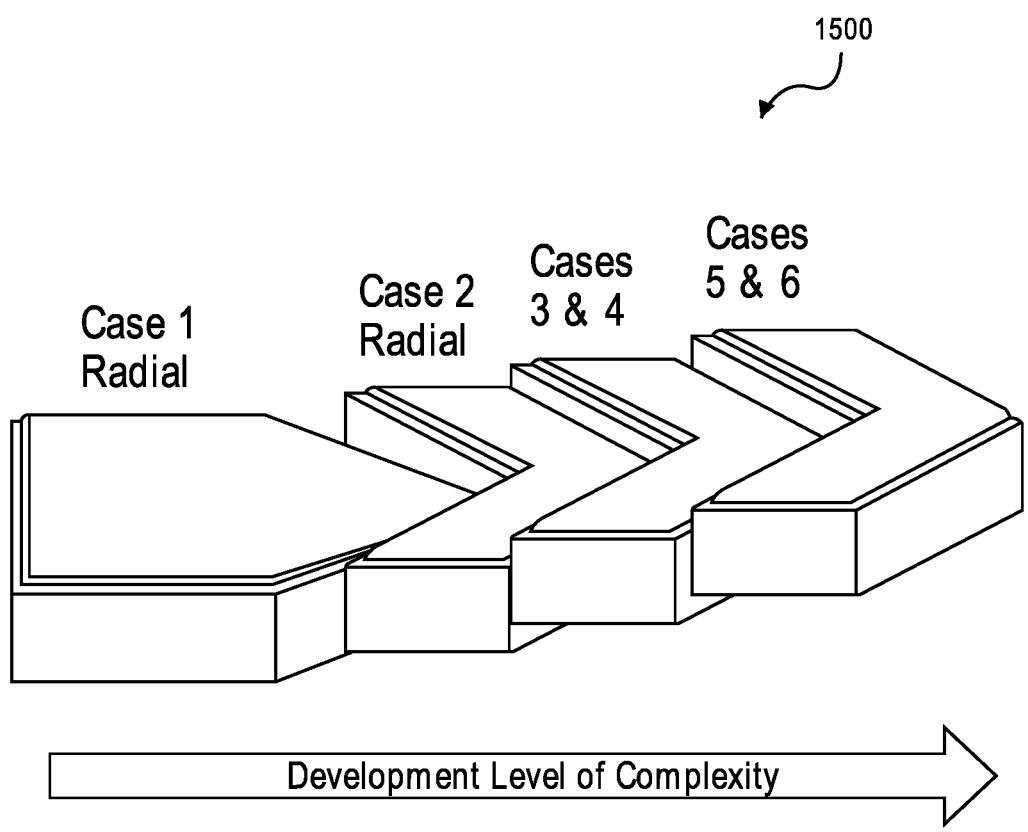
FIG. 15 illustrates a schematic view of a development strategy showing the application of the numerical model disclosed herein, according to an embodiment.

FIG. 15 illustrates a schematic view 1500 of a development strategy showing the application of the numerical model disclosed herein, according to an embodiment. Examples of the pressure-transient behavior and fluid front spatial position for six reference cases are presented to demonstrate the application of the numerical model technology. The solutions are presented in the order of development complexity, as shown in FIG. 15.

Figure 16:
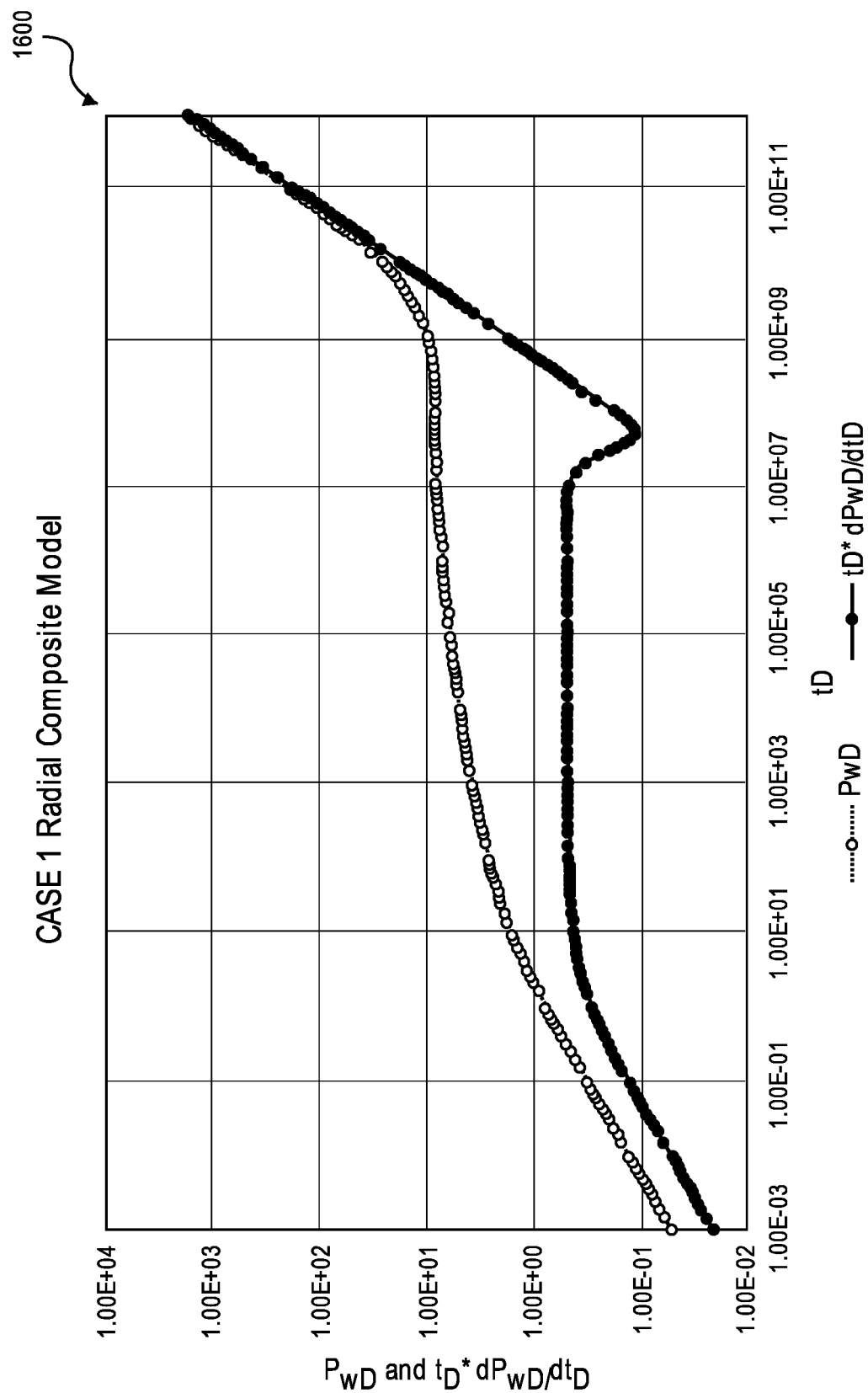
FIG. 16 illustrates a graph showing the pressure-transient behavior of an unfractured vertical well in a radial composite system, according to an embodiment.
Figure 17:
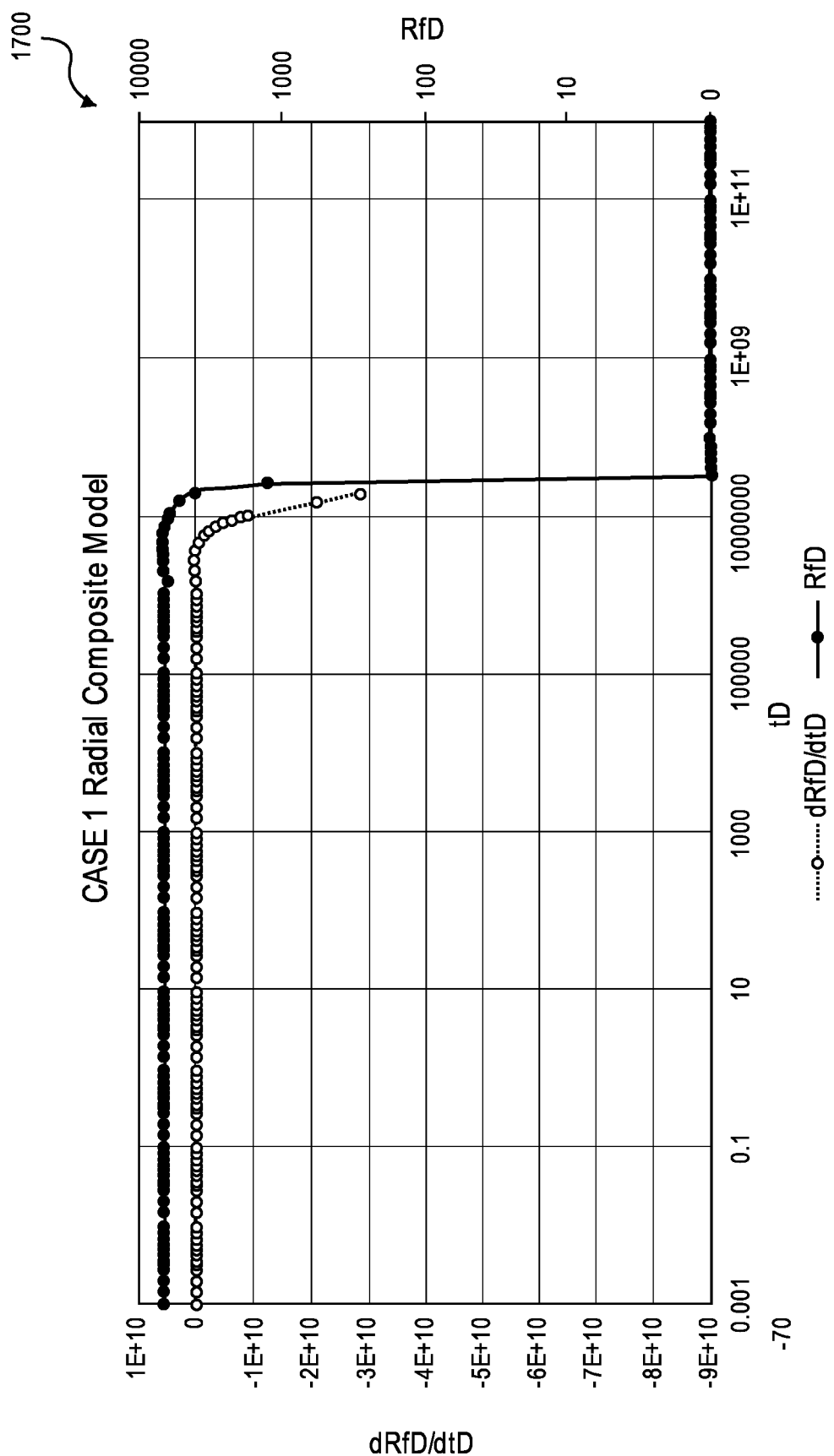
FIG. 17 illustrates a graph showing the fluid front position and velocity for the unfractured vertical well in the radial composite system, according to an embodiment.

Case (1): This case considered an unfractured vertical well centrally located in a radial composite system (see FIG. 4). FIG. 16 illustrates a graph 1600 showing the pressure-transient behavior of an unfractured vertical well in a radial composite system, according to an embodiment. FIG. 17 illustrates a graph 1700 showing the fluid front position and velocity for the unfractured vertical well in the radial composite system, according to an embodiment. The general fractional flow model incorporated in this investigation has been used to permit the direct use of laboratory relative permeability measurements, rather than using restrictive less complex correlations for the relative permeability relationships.

An example simulation of this reservoir and well configuration (for S=0 and $C_D$=0), with a dimensionless reservoir radial boundary ($r_{bD}$) equal to 6666.7 and aquifer no-flow external radial boundary ($r_{aD}$) at 33,333.3 is shown in FIG. 16. The sharp dip in the derivative function, beginning at a dimensionless time of about $1 \times 10^7$, corresponds to the time at which the fluid front begins to have movement. A minimum occurs at the point in time when the fluid front reaches the producing well. This early sign in the system response indicates that the fluid front is approaching the wellbore, before it arrives at the well. The result means that actions may be taken to delay the water breakthrough at the production well by reducing the well's production rate. In a multiple completion scenario, such as in a multilayer commingled system or a selectively completed horizontal well completion, reducing the production rate of an interval approaching water breakthrough without restricting the production from the other completed intervals would result in a recovery increase from the other completed intervals in the system before water breakthrough in the producing well.

Figure 18:
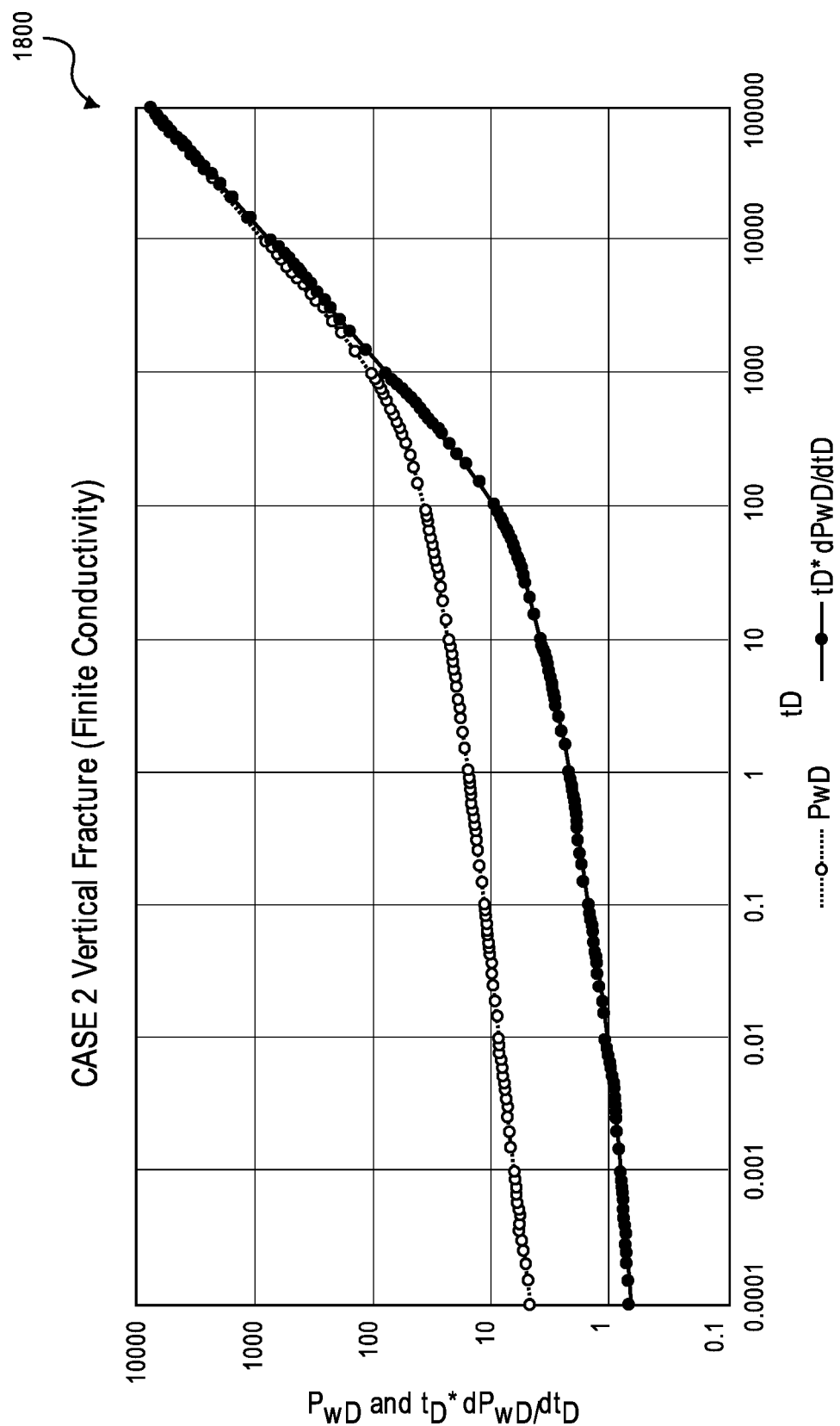
FIG. 18 illustrates a graph showing the pressure-transient behavior of a finite-conductivity vertical fracture in a linear composite system, according to an embodiment.
Figure 19:
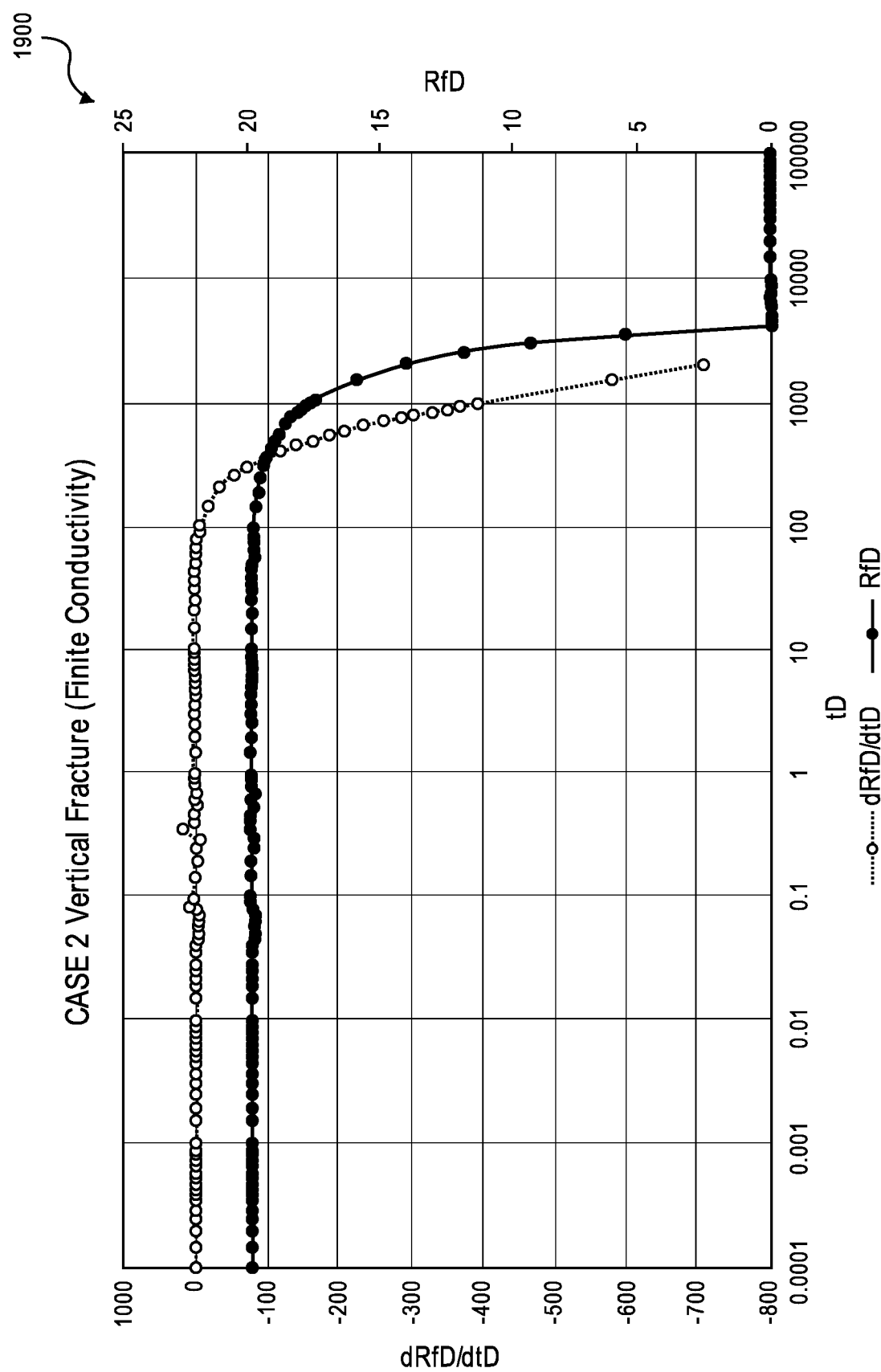
FIG. 19 illustrates a graph showing a front position and velocity for the finite-conductivity vertical fracture in the linear composite system, according to an embodiment.

Case (2): FIG. 18 illustrates a graph 1800 showing the pressure-transient behavior of a finite-conductivity vertical fracture in a linear composite system, according to an embodiment. FIG. 19 illustrates a graph 1900 showing a front position and velocity for the finite-conductivity vertical fracture in the linear composite system, according to an embodiment. An illustration of the linear flow model for the reservoir was shown previously in FIG. 5 in which one quadrant of the total system has been depicted with the remainder of the system being included by symmetry. The dimensionless fracture conductivity ($C_{fD}$) in this example is 3.75, with a linear distance of 10 from the fracture face to the reservoir boundary ($Y_{bD}$) and a linear distance of 50 to the aquifer no-flow external boundary ($Y_{aD}$). With the idealized assumption of purely linear flow in the reservoir to the plane of a finite-conductivity vertical fracture and for the specific dimensionless reservoir and fracture parameters selected in this example, there is not a distinct dip in the first derivative response, as observed for the radial flow case. There is, however, a subtle change in slope of the first derivative function when the fluid front begins to move at a predetermined rate, at a time of about 100 in this example. Evaluating of the second derivative function response in this case, as discussed in greater detail below, can often be used to more easily discern the onset of the fluid front movement when the first derivative function response is less distinct. The corresponding position and velocity of the fluid front for this example solution is given in FIG. 19.

Figure 20:
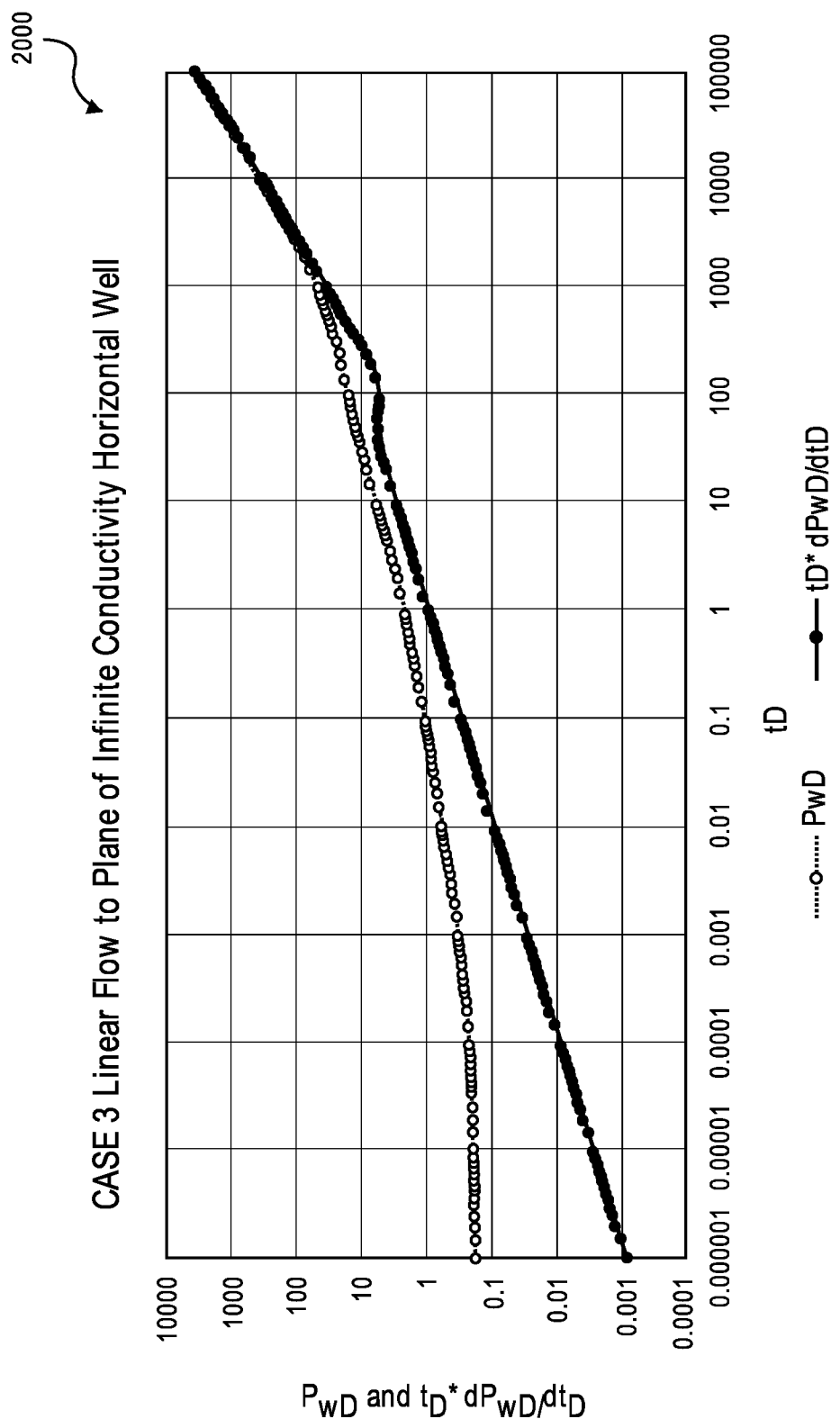
FIG. 20 illustrates a graph showing a pressure-transient behavior of a horizontal well in a linear composite reservoir, according to an embodiment.
Figure 21:
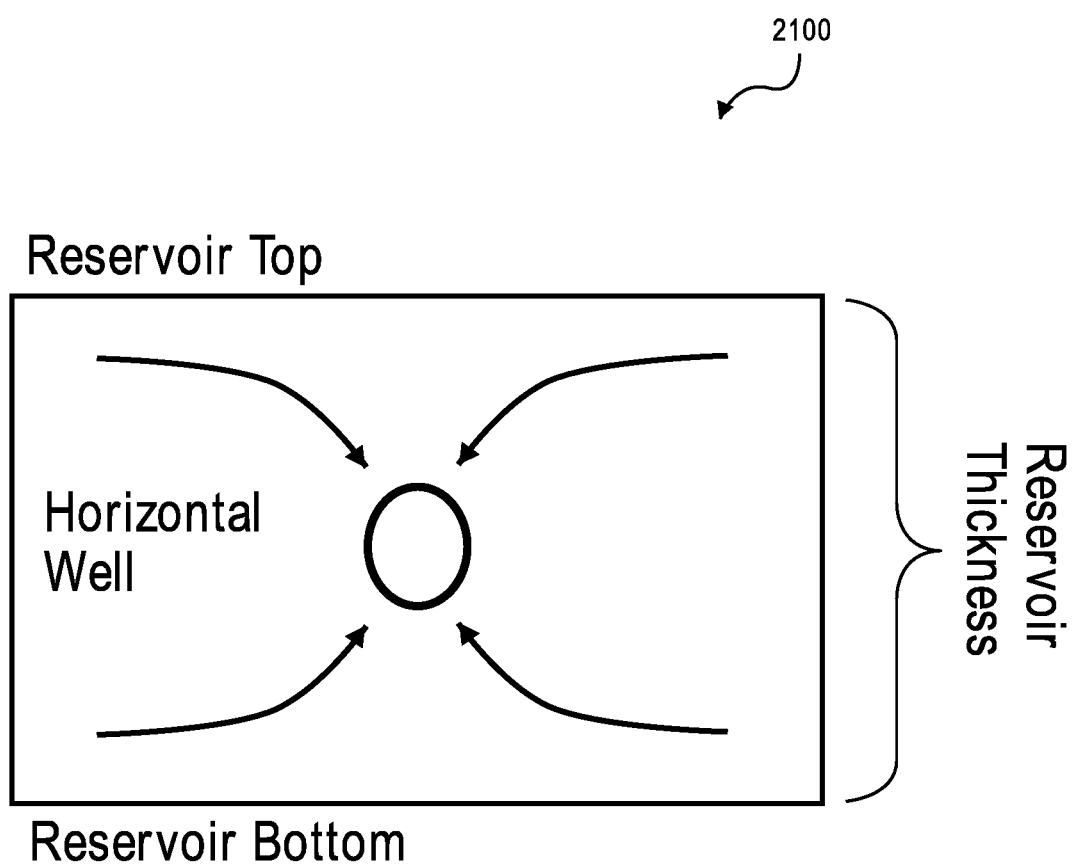
FIG. 21 illustrates a schematic view of converging flow toward an infinite-conductivity horizontal well, according to an embodiment.

Case (3): FIG. 20 illustrates a graph 2000 showing a pressure-transient behavior of a horizontal well in a linear composite reservoir, according to an embodiment. FIG. 21 illustrates a schematic view 2100 of converging flow toward an infinite-conductivity horizontal well, according to an embodiment. This example deals with the pressure-transient behavior of a fully-completed infinite-conductivity horizontal wellbore, with an assumption of strictly linear flow in a linear composite reservoir to the plane of the horizontal drainhole. An uninvaded oil reservoir is coupled to an aquifer water-invaded transition zone by an aquifer as illustrated in FIG. 5. In this case, the pressure-transient solution for the horizontal well includes a pseudoskin effect imaging component for the completion height of the wellbore (e.g., source or sink) in the reservoir height (see FIG. 21). The dimensionless linear distance to the reservoir boundary ($Y_{bD}$) was 40, and the linear distance to the aquifer external no-flow boundary ($Y_{aD}$) was 200. A distinct inflection of the derivative function clearly observed in the pressure-transient derivative behavior at a dimensionless time of approximately 30. This inflection in the pressure-transient response allows the user to identify water encroachment before the water breaks through at the producing well. At an early transient time, a separation between the pressure-transient behavior and the associated derivative function response is observed, which is due to the pseudoskin effect of partial completion of the reservoir height by the horizontal wellbore.

Figure 22:
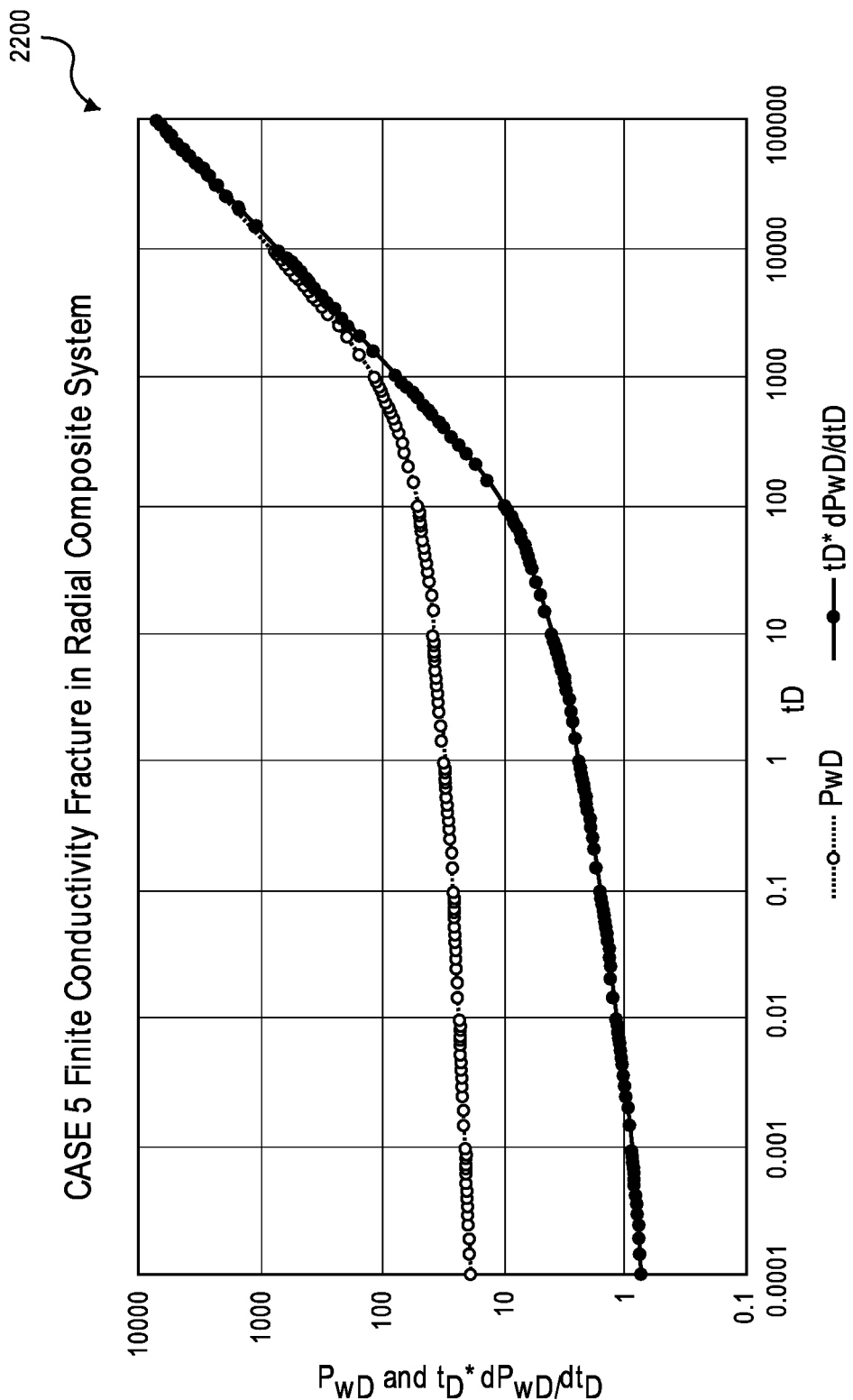
FIG. 22 illustrates a graph showing pressure-transient behavior of a vertical fracture intersected by a horizontal well, according to an embodiment.
Figure 23:
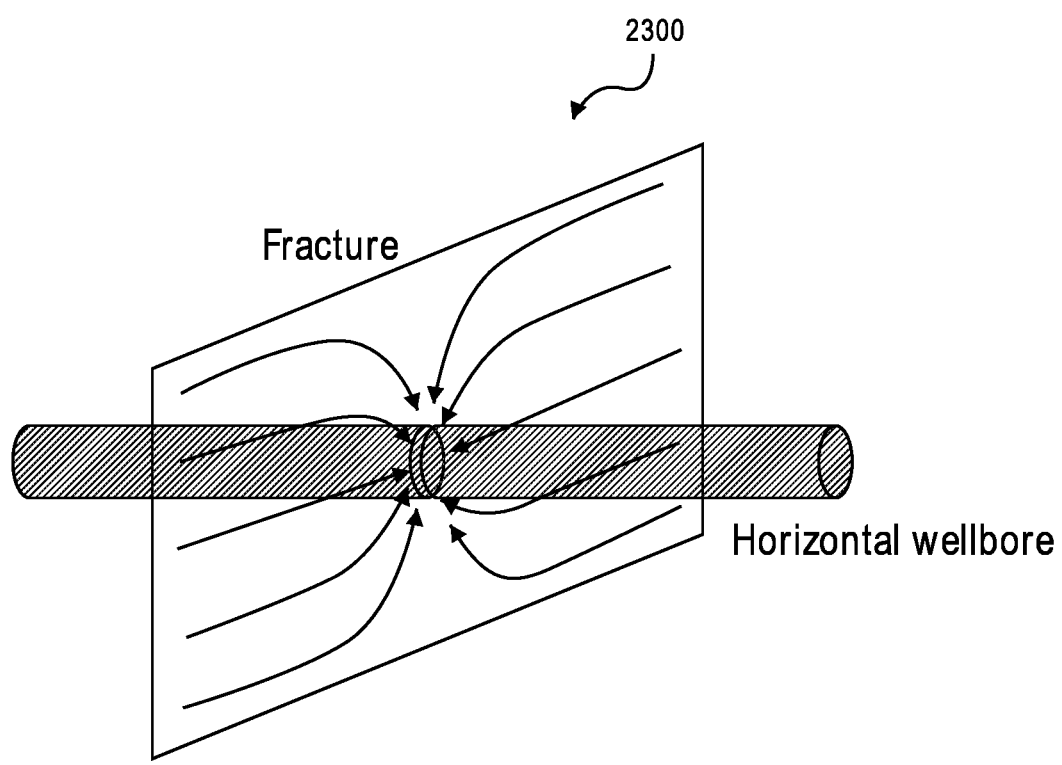
FIG. 23 illustrates a schematic view of converging flow within a finite-conductivity vertical fracture to a horizontal well, according to an embodiment.

Case (4): FIG. 22 illustrates a graph 2200 showing pressure-transient behavior of a vertical fracture intersected by a horizontal well, according to an embodiment. FIG. 23 illustrates a schematic view 2300 of converging flow within a finite-conductivity vertical fracture to the horizontal well, according to an embodiment. This case is an example of the pressure-transient behavior of a transverse finite-conductivity vertical fracture intersecting a horizontal wellbore in a linear composite reservoir, with moving fluid interface boundaries. The dimensionless fracture conductivity ($C_{fD}$) in this case was 0.1, the linear distance to the reservoir boundary ($r_{bD}$) was 20, and the linear distance to the aquifer no-flow external boundary ($r_{aD}$) was 100. A pseudoskin effect component due to converging flow within the vertical fracture to the horizontal wellbore (see FIG. 23) is an additional pressure drop in the system. Instead of implementing a 2D flow analysis for the vertical fracture, the converging flow pseudoskin effect is applied at the vertical fracture and horizontal wellbore intersection to account for the flow convergence while using a 1D flow analysis for the vertical fracture. The pseudoskin effect due to the converging flow in the fracture plane of the horizontal wellbore is exhibited at transient times and is readily discernable even at very early production time levels. A relatively smooth transition is indicated for the first derivative function. A second derivative function evaluation may be of assistance to identify the onset of the fluid front movement in the composite reservoir.

Figure 24:
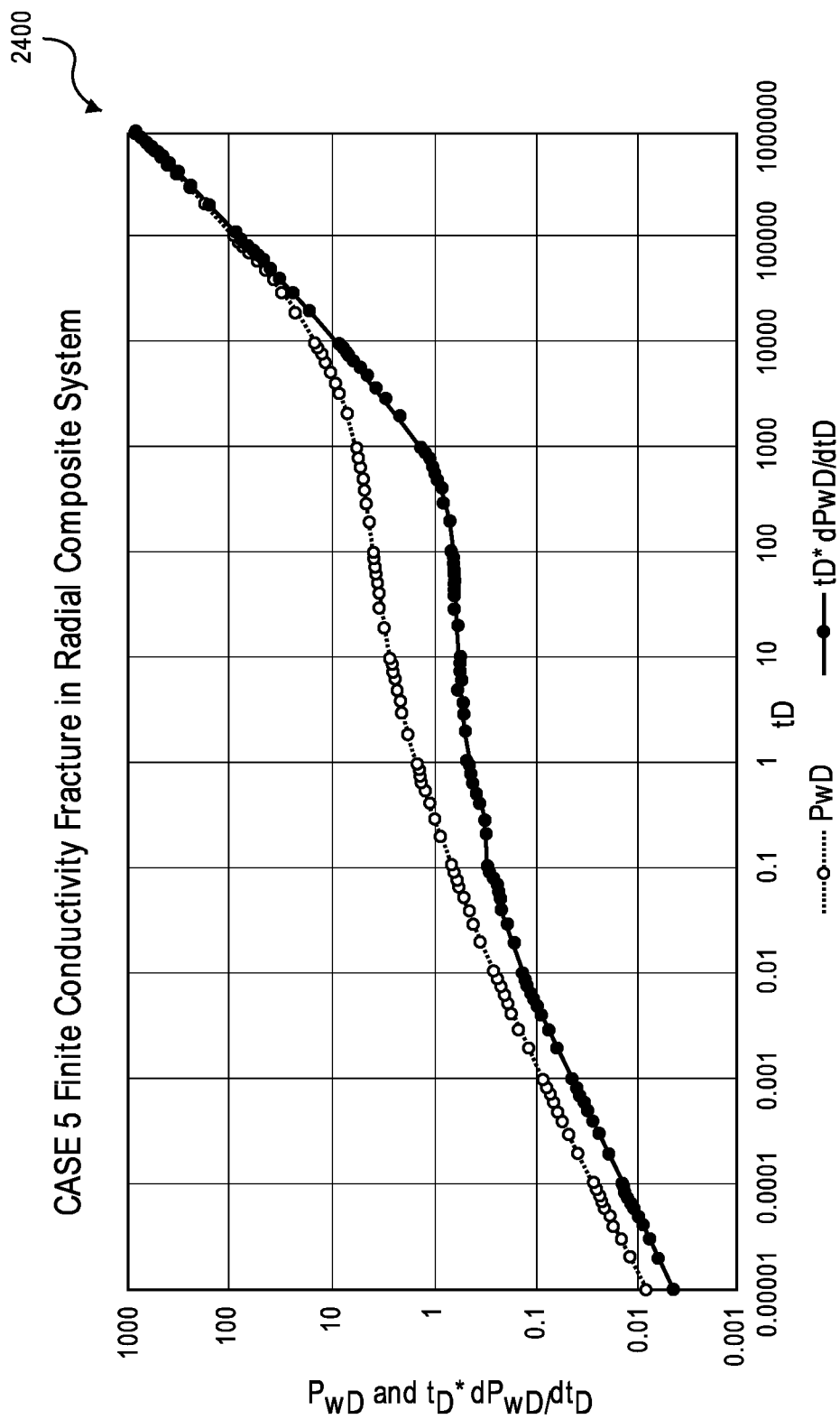
FIG. 24 illustrates a graph showing pressure-transient behavior of a fractured well in a cylindrical composite system, according to an embodiment.
Figure 25:
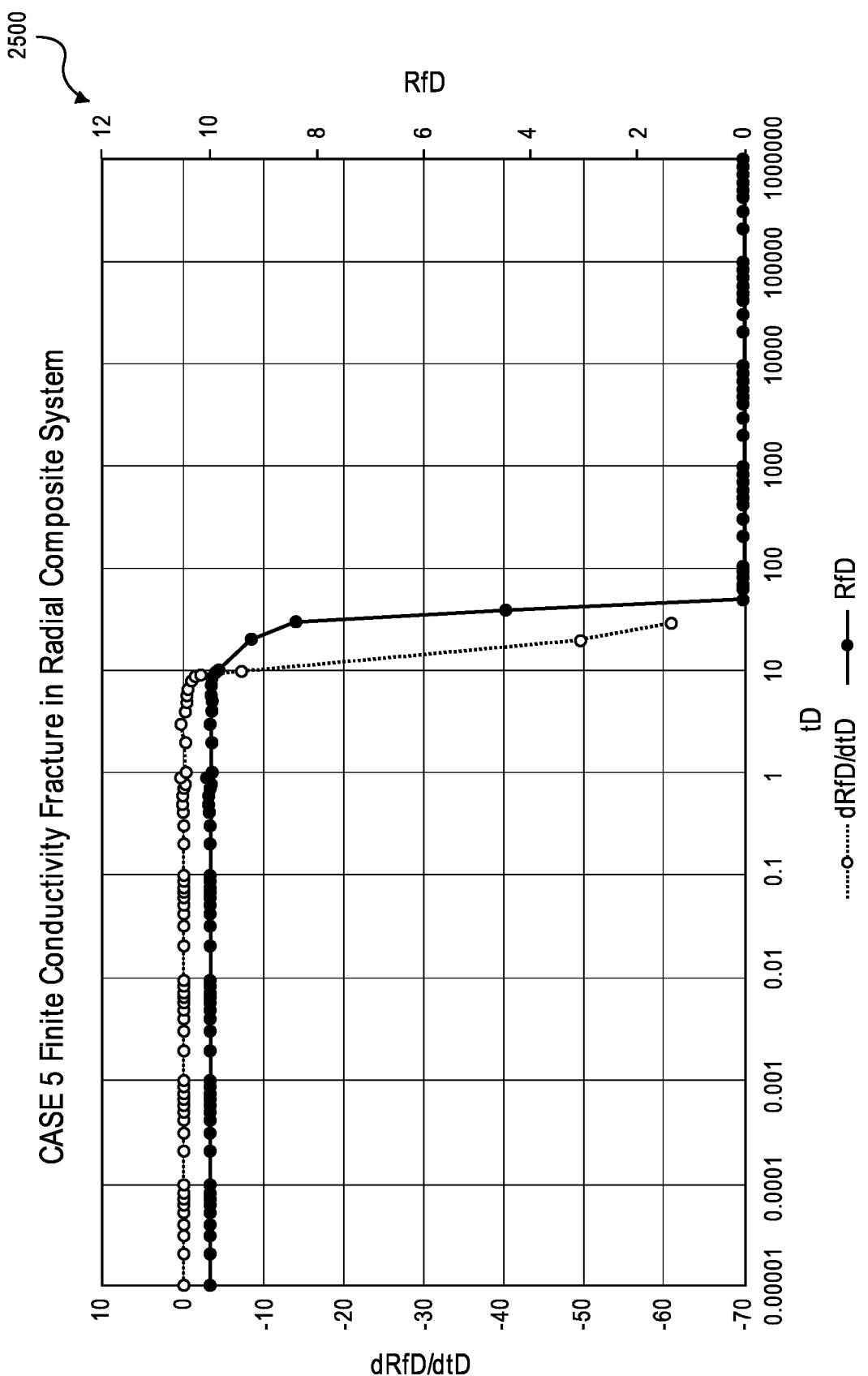
FIG. 25 illustrates a graph showing fluid-front position and velocity for a fractured well in a cylindrical composite system, according to an embodiment.

Case (5): FIG. 24 illustrates a graph 2400 showing pressure-transient behavior of a fractured well in a cylindrical composite system, according to an embodiment. FIG. 25 illustrates a graph 2500 showing fluid-front position and velocity for a fractured well in the cylindrical composite system, according to an embodiment. This case shows the pressure-transient behavior of a finite-conductivity vertical fracture intersected by a vertical well in a cylindrical composite reservoir, which has a moving fluid front interface and transition zone located between the reservoir boundary and the aquifer. The dimensionless fracture conductivity ($C_{fD}$) was 5 in this case, with a radial distance to the reservoir boundary ($r_{bD}$) of 10, and a radius to the external no-flow aquifer boundary ($r_{aD}$) of 50. Pseudolinear flow behavior is exhibited at early transient time ($t_D<0.01$) which is characterized by the log-log half slope, followed by an infinite-acting pseudoradial flow regime ($10<t_D<100$). Boundary-dominated flow behavior (characterized by unit slope) is exhibited at a late transient time ($t_D>40,000$), as is shown in FIG. 24. The associated position and velocity of the fluid front are presented in FIG. 25. The composite reservoir in this case was shown previously in FIG. 6. In this case, the reservoir is assumed to be isotropic, which makes the application of the frontal advance computations less complex. With this assumption, the shortest path to breakthrough into a bi-wing vertical fracture in a cylindrical composite system is at the fracture tips. This type of water encroachment also provides less advance warning time before the water reaches the wellbore than in cases where water advances to the fracture from a direction normal to the fracture plane. Even with less advance warning prior to water breakthrough, use of a second derivative response can provide a slightly more clear indication of the onset of fluid front movement than using the first derivative function response alone.

Figure 26:
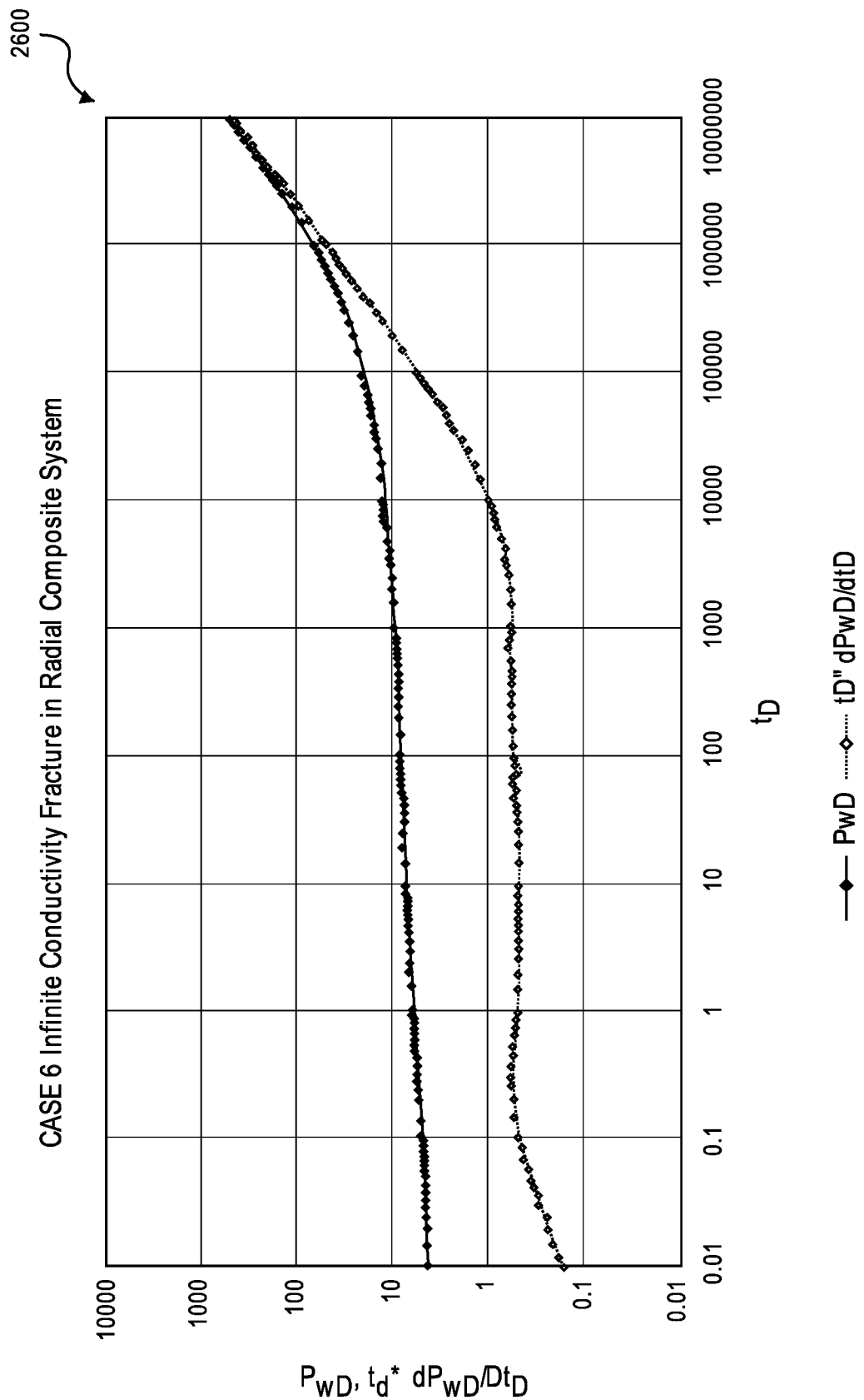
FIG. 26 illustrates a graph showing pressure-transient behavior of a horizontal well in a cylindrical composite reservoir, according to an embodiment.

Case (6): FIG. 26 illustrates a graph 2600 showing pressure-transient behavior of a horizontal well in a cylindrical composite reservoir, according to an embodiment. This case shows an example of the pressure-transient behavior of an infinite-conductivity horizontal wellbore centrally-located within the inner, uninvaded region of a composite reservoir having water encroachment from an adjacent aquifer due to fluid production at the well. The cylindrical composite reservoir includes an uninvaded oil zone, a transition zone that is invaded by water from the aquifer, and an active aquifer. The composite reservoir system in this example was depicted in FIG. 6. The isotropic reservoir assumption has also been used in this example case to make the frontal advance analysis less complex and more tractable. The dimensionless wellbore radius ($r_{wD}$) in this example was 0.003, and the wellbore length was 50 ft, with a radial distance to the reservoir boundary ($r_{bD}$) of 40 and a radius of the aquifer external boundary ($r_{aD}$) of 200.

Figure 27:
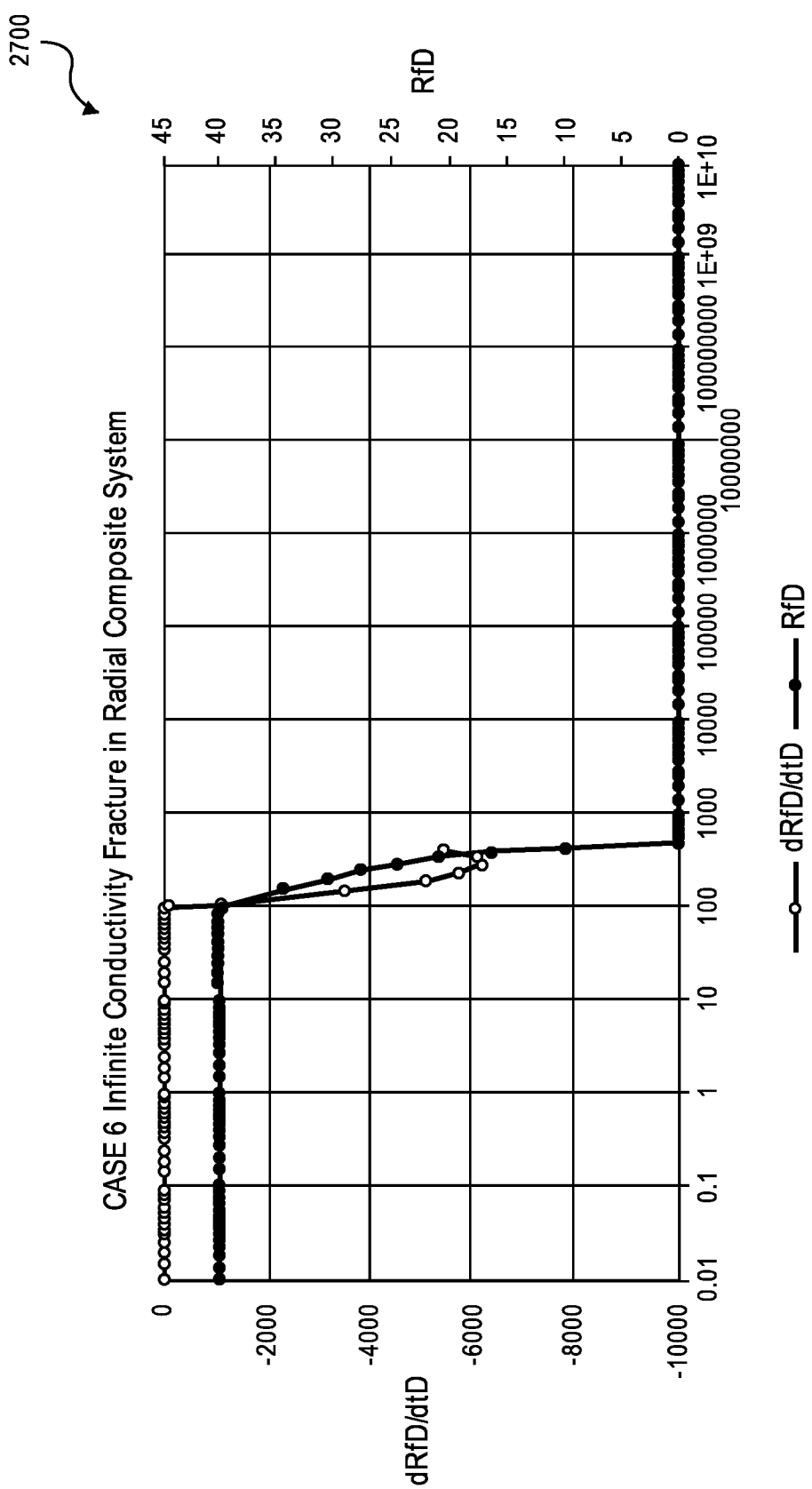
FIG. 27 illustrates fluid front position and velocity for a horizontal well in a cylindrical composite reservoir, according to an embodiment.

FIG. 27 illustrates a schematic view 2700 of a fluid front position and velocity for a horizontal well in a cylindrical composite reservoir, according to an embodiment. This case also results in an advance indication of an impending water breakthrough in the producing well due to the shortened flow path to the heel and toe (e.g., endpoints) of the horizontal wellbore. Also, isotropic conditions have been assumed for this example simulation. In this case, the user may attempt to gain some additional advanced indication of impending water encroachment using the second derivative response. As discussed in several of the example results that have been presented, when the onset of impending fluid front movement in the reservoir occurs, the first derivative function may not provide a clear and distinct indication of the fluid front movement. The user may also look at the second derivative function response, as described in greater detail below.

Second Derivatives Aid in Identifying Advancing Fluid Fronts

Using a second derivative can aid in identifying certain system transient events (e.g., such as fluid movements) when used in conjunction with the traditional pressure-transient and the first derivative function responses.

Figure 28:
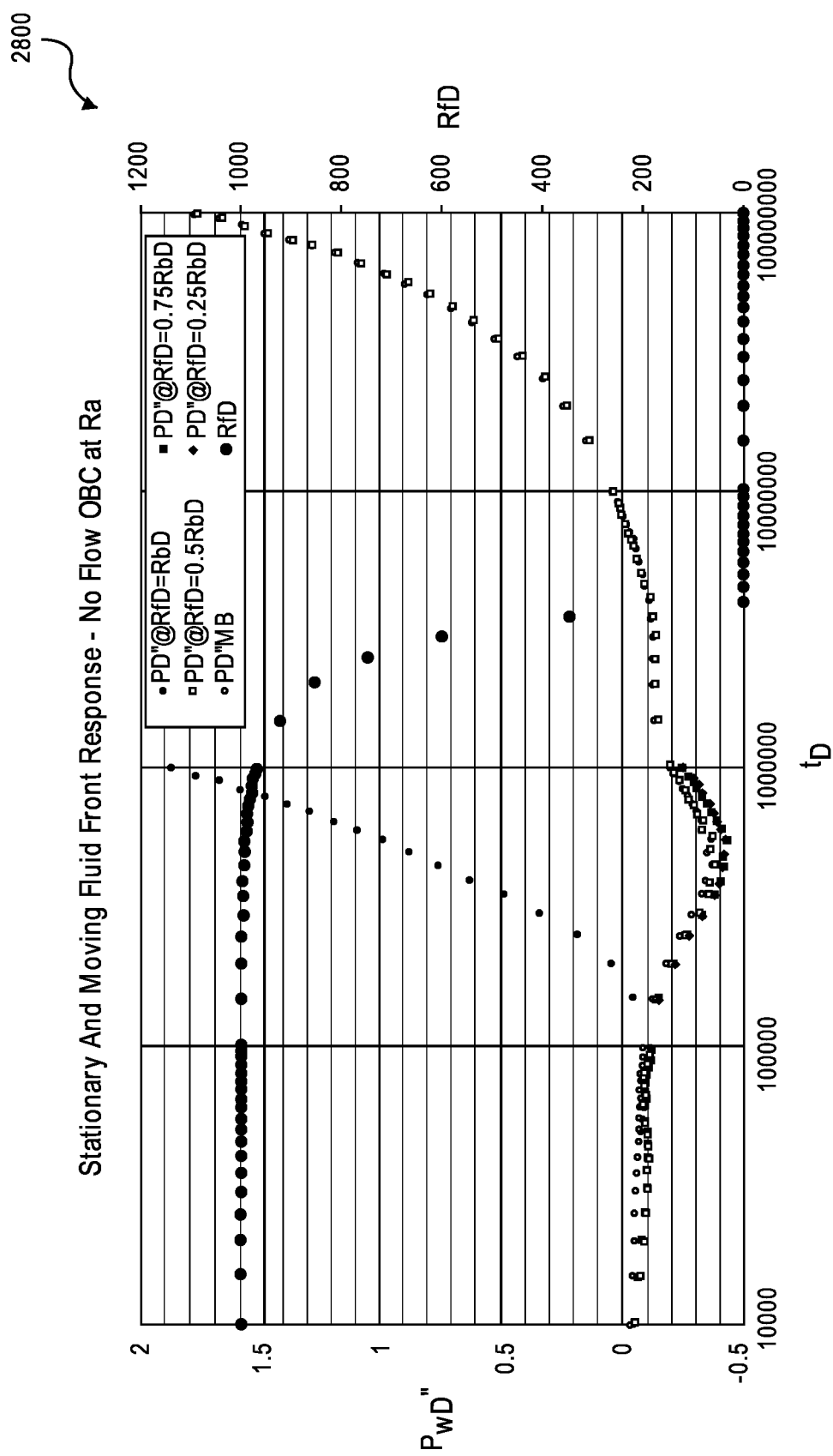
FIG. 28 illustrates a graph showing how a second derivative function can help identify the onset of fluid front movement, according to an embodiment.
Figure 29:
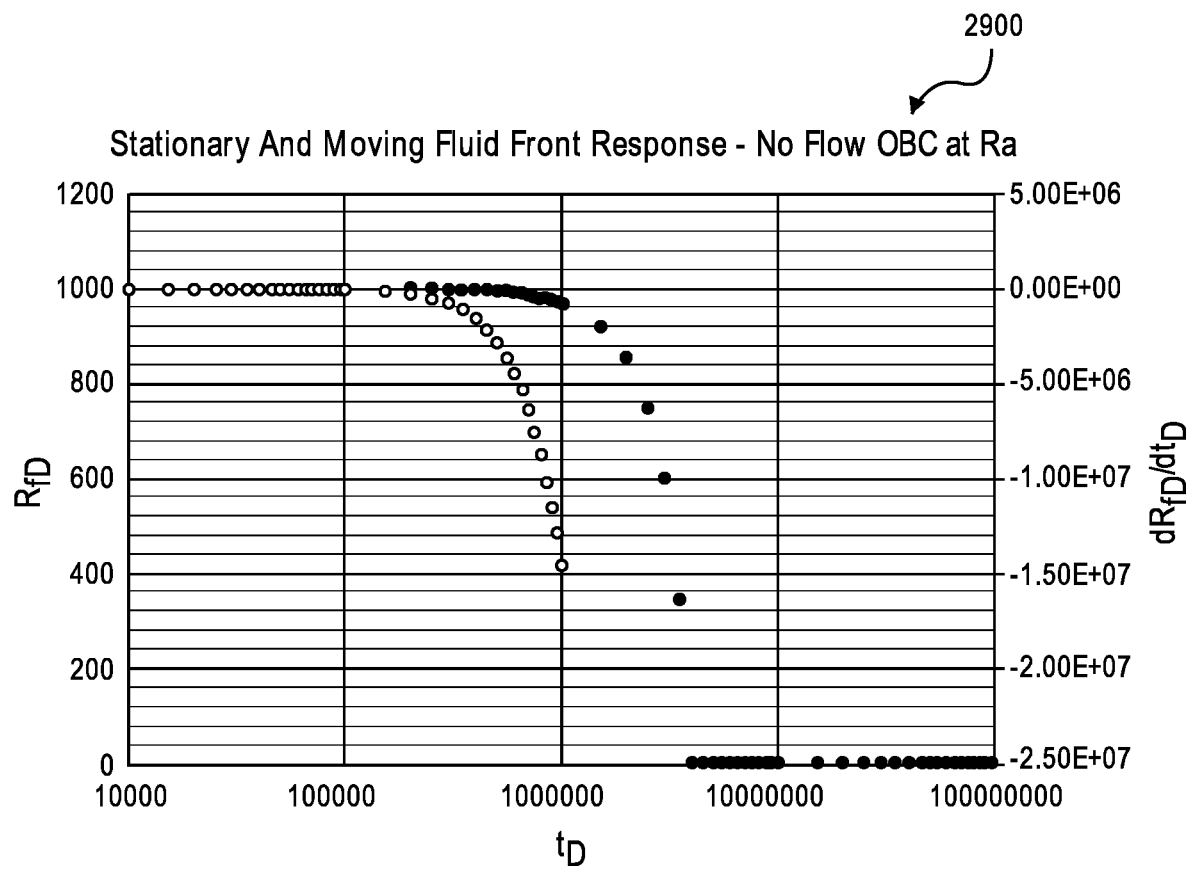
FIG. 29 illustrates a graph showing position and velocity of a fluid front with a no flow outer boundary condition at an aquifer external boundary, according to an embodiment.

FIG. 28 illustrates a graph 2800 showing how a second derivative function can help identify the onset of fluid front movement, according to an embodiment. FIG. 29 illustrates a graph 2900 showing position and velocity of a fluid front with a no flow outer boundary condition at an aquifer external boundary, according to an embodiment. More particularly, the graphs 2800, 2900 show an example of applying the second derivative function response to identify the onset of water encroachment to an unfractured producing vertical well in a radial composite system. The onset of fluid front movement can be identified using the second derivative function as early as dimensionless time of $1\times10^5$ in this example. This result demonstrates that earlier detection of the water encroachment using the second derivative function is possible for determining the position and velocity of the fluid front.

Considerations

The models described above were programmed in Fortran and compiled using Intel® Parallel Studio XE—Composer Edition. A spatial logarithmic grid was used with $N_r=N_y=200$ discretized blocks. Also, logarithmic distributed time points were used at which the pressures were computed. For the Stehfest inversion algorithm, a Stehfest parameter of $N_s=10$ was used for the solution inversion from Laplace space to the real-time domain to achieve sufficiently accurate and stable solutions in pressure, pressure derivative, fluid interface of front velocity and position in most cases.

The Stehfest numerical Laplace transform inversion algorithm was initially chosen to evaluate the Laplace transform solutions because it involves real space function evaluations. Occasionally, however, there were stability and accuracy issues observed in the simulation results obtained when using the Stehfest algorithm to perform the numerical inversion of the Laplace transform solutions. Increasing the Stehfest parameter or the number of grid blocks tended to magnify the noise. A modification of the Stehfest algorithm was implemented; however, no further improvement in the results was detected. With the issues of instability and inaccuracy (e.g., "noisy results") in the inverted numerical solution that were observed in some of the simulation cases, using a different numerical Laplace transform algorithm was also investigated. A sufficiently accurate numerical Laplace transform inversion algorithm, which may minimize the instability issues encountered with the inversion algorithm, was the Laplace transform inversion algorithm. However, using this inversion model may cause the function evaluations to involve complex arithmetic.

The time intervals in the numerical simulation results obtained with the Stehfest Laplace transform inversion algorithm during which the simulation instabilities occurred were found to be at the point in time when the fluid front was computed to begin exhibiting appreciable movement in the reservoir. Smoothing and interpolation techniques applied in the region of the simulation results with instability issues were found to be a practical solution for most cases where this problem occurred.

When Case 1 (i.e., radial flow to a vertical well) was originally developed, it was sufficient to use a simple, linear tridiagonal system solver). On the contrary, when transitioning to the 1D linear flow system cases (i.e., vertical fractures and horizontal wellbores), instability issues were encountered due to scaling of the coefficients. To overcome this problem, (e.g., lower and upper) LU-decomposition with scaled implicit partial pivoting and back-substitution for nonsingular matrices was employed to accurately obtain the linear system solution.

Finite-conductivity vertical fracture solutions in Case 2 and Case 4 involved a reformulation of the expression for the pressure at the wellbore to overcome spurious results observed at early times. To remedy this problem, these cases were also formulated assuming 1D linear flow in the fracture; thus the dimensionless wellbore pressure in Laplace space given by:

$$\overline{p}_{wD} = (\overline{p}_{FD})_{x_D=0} = \frac{\pi}{uC_{FD}\sqrt{\alpha_F^*}\tanh\left(\sqrt{\alpha_F^*}\right)} \quad (1)$$

where Eq. 1 was modified accordingly with $\alpha^*_F = \alpha^*_F(\beta^*_F, C_{FD}, \eta_{FD}, u)$. Determination of $\beta^*_F$ is performed in an ad-hoc manner using the following relationship.

$$\frac{1}{(\overline{p}_{FD})_{x_D=0}}\left(\frac{\Delta\overline{p}_{1D}}{\Delta y_D}\right)_{y_D} = -\beta_F^* \quad (2)$$

As used herein, $P_{wD}$=dimensionless wellbore pressure, u=Laplace domain parameter-dual porosity reservoir function product, u=sf(s), $C_{fD}$=dimensionless fracture conductivity, and $Y_D$=dimensionless spatial position in Y direction, $Y_D=Y/L_c$.

The approximate pressure derivative in Eq. 2 is defined with respect to the inner region solution in the model. The value for $\overline{p}_{FD}$ at the wellbore is determined analytically by adopting the pseudofunction assumption stating that the pressure of the hydraulic fracture is not a function of the distance in the y-direction.

Evaluating the pressure-transient behavior of a vertically fractured well centrally-located in the inner region of a circular composite reservoir (Case 5) can be effectively developed using a hybrid solution constructed using the analytic solution for a vertical fracture in a cylindrical composite reservoir. The composite reservoir system for Case 5, illustrated in FIG. 8 with the analytic solution for the innermost region of the composite system, contains the vertical fracture being evaluated out to a radial interface position equal to the distance from the midpoint to the tips of the vertical fracture ($r=X_f$). The analytic solution developed for the inner region of the composite system containing the vertical fracture is coupled to the finite-difference solution for the remainder of the inner region of the composite reservoir (from the tips of the fracture) to the flood front ($r_f$). The finite-difference solution in this case is analogous to the three-region radial flow solution that was used in Case 1. In this composite system solution, the inner region of the finite-difference model extends from the fracture tip ($X_f$) to the leading edge of the fluid front (at $r_f$). The transition zone extends from the flood front to the boundary between the invaded zone and the aquifer ($r_b$), and the aquifer external boundary located at $r_a$.

The development of the corresponding hybrid solution for the pressure-transient behavior of a horizontal well centrally located in a circular composite reservoir (Case 6) can be constructed in a similar manner. The horizontal well is centrally located in the inner region of a circular composite reservoir. The analytical solution for the inner region is coupled with the finite-difference formulation of the circular composite reservoir model at a radius equal to the wellbore half-length (e.g., at the toe and heel of the horizontal well) for the remainder of the inner region of the composite system, which is then coupled with the finite-difference model for the transition zone and aquifer. Otherwise, the finite-difference model for the circular composite reservoir containing a horizontal well within the inner region (Case 6) is analogous to that previously described for the vertical fracture case (Case 5), with the transition zone located between $r_f$ and $r_b$, and the aquifer extending to a radius of $r_a$.

The computational algorithm developed for computing the pseudoskin effect due to converging flow in the reservoir of thickness h to a horizontal wellbore is described above with respect to FIG. 23. The converging flow pseudoskin effect relationships for Case 3 (i.e., converging flow in the reservoir of height h to a horizontal wellbore) also used measures to address numerical convergence issues. To remedy this problem, the image solutions inherent with the theoretical development had to be recast for practical implementation.

Model Extensions

Figure 30:
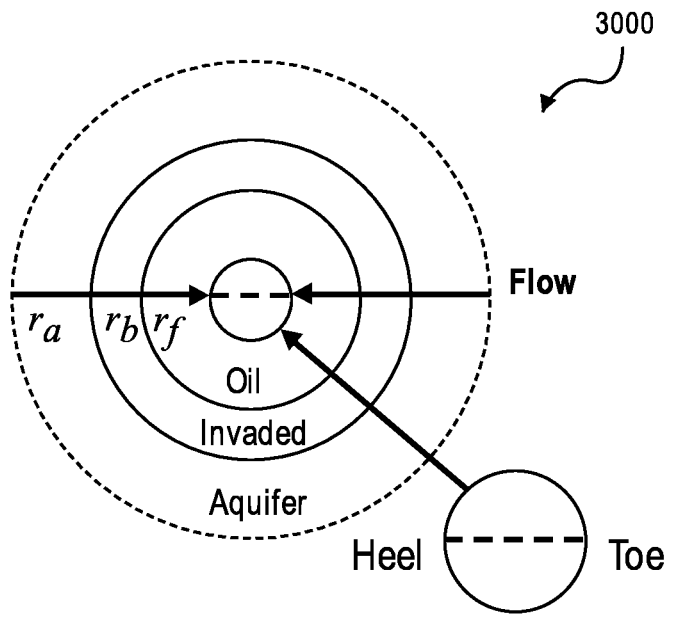
FIG. 30 illustrates a schematic view of a selectively completed horizontal well in a cylindrical composite system, according to an embodiment.

FIG. 30 illustrates a schematic view 3000 of a selectively completed horizontal well in a cylindrical composite system, according to an embodiment. The application of the moving fluid front solution methodology can also be extended to other well types such as selectively completed horizontal wells in cylindrical composite systems as shown in FIG. 27. For example, a solution in Laplace space for a selectively completed horizontal well within a laterally infinite slab reservoir geometry can be modified to include cylindrical bounded reservoir imaging for the inner region of a composite reservoir in the method presented herein. This integrated solution may be used as a monitoring tool in conjunction with an advanced completion technology. For two-phase flow near the wellbore in these types of systems, a 2D frontal advance model may be used. In addition, the Laplace-domain, single-layer, pressure transient solutions may be readily incorporated into a commingled reservoir solution for use in multilayer reservoir applications.

Fractional flow frontal advance theory assumes the mobilities ahead of (e.g., in the oil zone) or behind (e.g., in the aquifer or gas zone) the front are substantially constant. In the case where gas is the displacing fluid, if pressure is assumed to be nearly constant, the theory still holds and the algorithm will remain valid. The immiscible water-alternating gas injection problem using a modified approach by for three-phase flow, highlighted comparable pressure and pressure derivative results with a commercial reservoir simulator despite their assumption of incompressible uid in the gas phase for saturation calculations.

Production pressure-transient analysis uses a sequence of drawdown or buildup test periods. Though not directly considered in the analysis of pressure buildup transients, the user can develop such a solution using the principle of superposition. This has been investigated successfully for Case 1. Assuming a well was produced at a constant rate for a period $t_{Dp}$ before it was shut-in, the pressure after time $\Delta t$ is given by $$p_{wD}(\Delta t_D) = p_D(t_{Dp} + \Delta t_D) - p_D(\Delta t_D) \quad (3)$$

Applying this principle, the shut-in pressure $p_{D_{shutin}}$ is obtained from the Laplace pressure solution $\bar{p}_D(u)$ as follows:

$$p_{wD}(\Delta t_D) = L^{-1}[\bar{p}_D(u_1) - \bar{p}_D(u_2)] \quad (4)$$

where $u_1$ and $u_2$ are the dimensionless time of $t_{Dp} + \Delta t_D$ and $\Delta t_D$, respectively. Generalizing to a multi-rate solution, the following equation is derived:

$$p_{wD}(\Delta t_D) = \sum_{i=1}^{n} \frac{(q_i - q_{i-1})}{q_n} [p_D(t_{Dp} + \Delta t_{Di}) - p_D(\Delta t_{Di})] \quad (5)$$

As used herein, $P_{wD}$=dimensionless wellbore pressure, $t_D$=dimensionless time, $P_D$=dimensionless pressure, $P_{wD}$=dimensionless wellbore pressure, L=reference length, ft, u=Laplace domain parameter-dual porosity reservoir function product, u=sf(s), and q=well flow rate, STB/D.

It is possible to combine nonlinear regression with a gradient-based algorithm to provide a computational method for well testing parameter estimation (i.e. flood front location, wellbore storage, and mobility profile in the flooded zone). Predicted data and their gradients to be inverted numerically with the Stehfest algorithm to achieve the Laplace-transformed solution.

The methodology described herein centers on developing a pressure or rate-transient model for the predicting and evaluating of the transient behavior of a planar, vertically-fractured well or horizontal wellbore under linear or radial flow conditions or linear flow to a vertical fracture intersected by a horizontal wellbore. The well-reservoir model was idealized by a three-region composite system undergoing edge-water drive, whereby the fluid interface spatial locations between the uninvaded oil zone and the water-flooded transition zone are permitted to vary with production time. The solution strategy couples the Laplace transform finite-difference numerical technique with the Buckley and Leverett frontal advance formula. A general fractional flow model has been implemented with parameters that are calibrated using laboratory measurements of oil-water relative permeability values. This, in turn, provides a more realistic representation of the saturation profile within the flooded transition zone.

Monitoring the transient behavior permits detection of water encroachment to the producing well, prior to breakthrough. Examples of the pressure-transient behavior and fluid interface or front position (e.g., including velocity) for six reference cases were presented to demonstrate the application of this methodology. When the onset of impending fluid front movement in the reservoir occurs, the first derivative function might not provide a clear and distinct indication of the fluid front movement. In such cases, the second derivative function response may also be evaluated. Thus, a new modeling strategy for monitoring and subsequently calibrating results to initialize field-wide surveillance involving additional sophisticated simulation is described herein.

Figure 31:
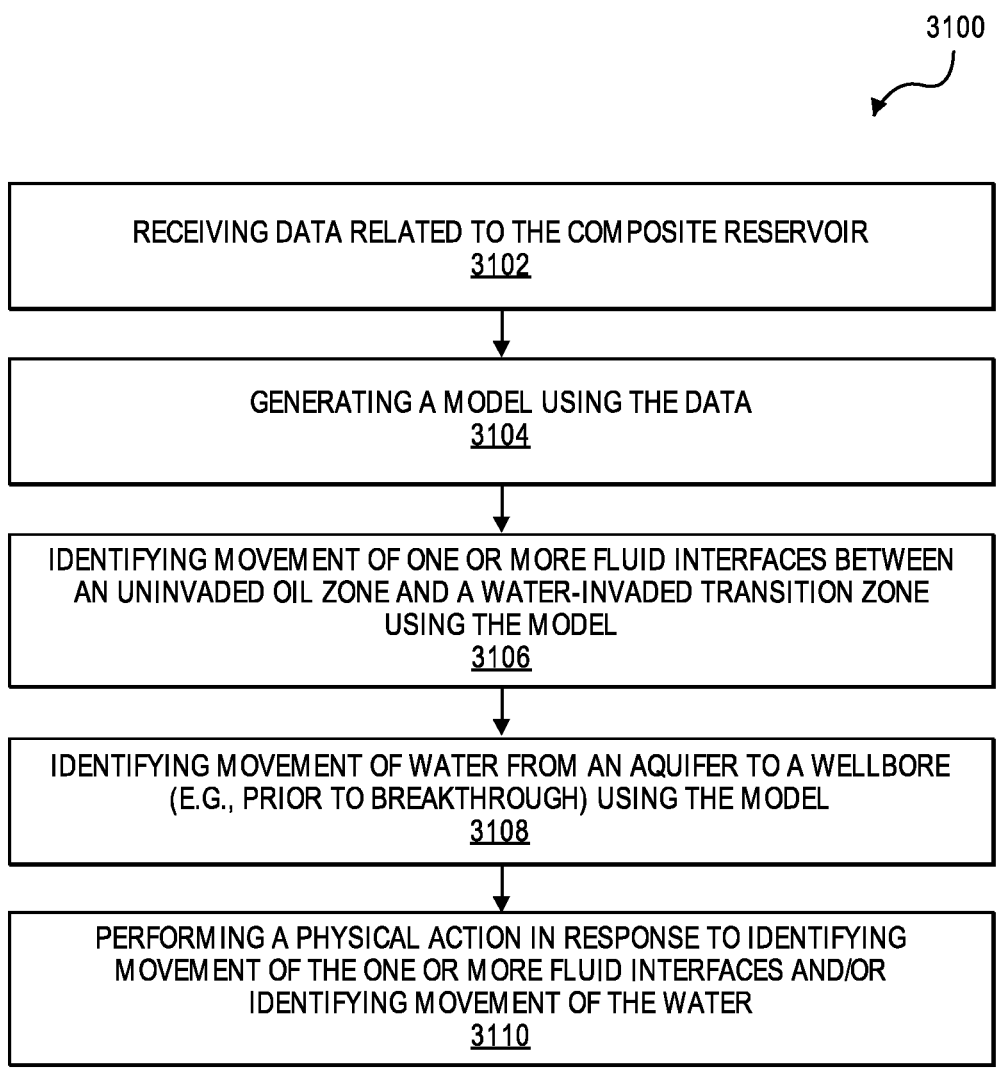
FIG. 31 illustrates a flowchart of a method for monitoring movement of a fluid interface in a subterranean formation, according to an embodiment.

FIG. 31 illustrates a flowchart of a method 3100 for monitoring movement of a fluid interface in a (e.g., composite) reservoir, according to an embodiment. The method 3100 may include receiving data related to the composite reservoir, as at 3102. In one example, the data may be or include a downhole/bottomhole pressure in the wellbore. The data (e.g., bottomhole wellbore pressure) may be recorded using a permanent downhole gauge (PDG) or any other pressure gauge that is used to measure bottomhole wellbore pressures as a function of time. The bottomhole pressure gauge may be used to measure the pressure in the wellbore near the completed interval in the wellbore as a function of time.

The composite reservoir may include an uninvaded oil zone, a water-invaded transition zone, and/or an active aquifer. The composite reservoir may be radial or linear. The reservoir flow configuration may be dependent on the type of well. An unfractured vertical well that is completed in a cylindrical reservoir may employ a radial flow coordinate system. The case of a single vertical fracture intersecting a vertical wellbore may use a linear flow configuration. Similarly, the case of a horizontal wellbore intersecting one or more vertical fractures may use the linear flow formulation for flow in the reservoir to the plane of the vertical fractures and also includes a converging flow apparent steady state skin effect for converging flow within the fracture to the horizontal wellbore that intersects the fractures. The case of an unfractured horizontal drainhole (i.e., wellbore) in a rectangular reservoir drainage area may use the linear flow configuration to the vertical plane containing the horizontal wellbore in the reservoir, with an additional converging flow steady state skin effect to account for converging flow in the reservoir from the formation height to the horizontal wellbore diameter. The last two cases that were addressed above included water encroachment solutions for flow to a vertical fracture or a horizontal drainhole in a cylindrical composite reservoir that utilizes a hybrid combination of both linear and radial flow geometries, with linear flow within the plane of the vertical fracture (solved analytically), equivalent radial flow in the reservoir region adjacent to the plane of the vertical fracture or horizontal wellbore (solved analytically), and the equivalent radial flow in the reservoir beyond the tips of the source/sink (vertical fracture or horizontal well) length solved numerically because this region contains the moving fluid interface.

The method 3100 may also include building/generating a (e.g., predictive) model using the data, as at 3104. The model may include a pressure-transient response and/or a rate-transient response of a producing wellbore located in the composite reservoir in which water encroachment occurs. Fluid interfaces between the uninvaded oil zone and the water-invaded transition zone may move/vary with time. The position and velocity of the interface between the uninvaded oil zone and the leading edge of the water-invaded transition zone may be determined using the fractional flow and frontal advance models. Rather than assuming that the fluid front interface is stationary (e.g., a pseudosteady state assumption) during the period of the transient being evaluated, the solution permits the fluid interface to continuously move with respect to time, honoring the specified laboratory relative permeability and fractional flow data, the frontal advance model used.

The wellbore may be or include (1) an unfractured vertical wellbore, (2) a finite and/or infinite-conductivity vertically-fractured wellbore intersected by vertical and/or horizontal wellbores, and/or (3) a horizontal wellbore. The 6 examples provided above are the most common configurations currently encountered in water encroachment cases, but the solution procedures are applicable to other wellbore and reservoir configurations as well that may arise in the future.

The method 3100 may also include identifying movement (e.g., position and velocity) of one or more fluid interfaces between the uninvaded oil zone and the water-invaded transition zone using the model, as at 3106. In at least one embodiment, this may include altering/updating the model in response to (and/or to reflect) the movement of the one or more fluid interfaces. Identifying movement of the fluid interfaces may include evaluating the first derivative function of pressure change in the composite reservoir (e.g., in the wellbore) with respect to time. The first derivative function is the Bourdet pressure-transient derivative function that is used in wellbore test pressure transient analyses (e.g., $\Delta t * d(\Delta P)/d(\Delta t)$). Identifying movement of the fluid interfaces may also include evaluating the second derivative function of the pressure change with respect to time. The second derivative function is the rate of change in the composite reservoir (e.g., in the wellbore) with respect to time of the first derivative function response with respect to time. Therefore, it is equal to $\Delta t * d/d\Delta t [\Delta t * d(\Delta P)/d(\Delta t)]$.

The method 3100 may also include identifying movement of the water from the aquifer to the wellbore (e.g., before the fluid front reaches the wellbore; prior to breakthrough) using the model, as at 3108. In at least one embodiment, this may include altering/updating the model in response to (and/or to reflect) the movement of the water. Identifying movement of the water may be performed using the pressure-transient response (e.g., in/from the model) and/or the derivative response (e.g., in/from the model) of the producing wellbore performance. In the vertical wellbore embodiment (e.g., with radial flow), there may be a marked dip in the derivative signature at about ½ log cycle in time prior to breakthrough. This response in the derivative function is a result of the fluid interface movement toward the producing well. In the linear flow cases, the moving interface also results in a noticeable change in the derivative function (e.g., more easily observed in the second derivative function) response when there is a predetermined amount of movement of the fluid interface toward the producing well.

Identifying movement of the water may include identifying the volume of water encroached from the aquifer into the transition zone using mass balance from the frontal advance. Conventional composite reservoir models cannot accomplish this because they assume that the fluid front (i.e., interface position) is a pseudosteady state (i.e., stationary) condition. In contrast, the numerical model disclosed herein permits evaluation of the position of the fluid front at any point in time and also how fast the front is approaching the producing well.

The method 3100 may also include performing a physical action in response to identifying movement of the fluid interfaces and/or identifying movement of the water, as at 3110. For example, it has been determined that water encroachment is occurring (i.e., water movement toward the producing well), the user/operator can alter the drawdown at the producing wellbore to (1) delay water breakthrough at the producing well, (2) prolong the production of other completed intervals in the well, and/or (3) implement remedial treatments such as polymer, cement, or chemical squeeze of interval with imminent water production to slow or stop water encroachment to the producing wellbore at that interval. Altering the drawdown at the producing wellbore may include altering (e.g., increasing or decreasing) the difference between the average reservoir pressure and the flowing bottomhole pressure. Altering the drawdown at the producing wellbore may also include altering (e.g., increasing or decreasing) the difference in height between the static level and the dynamic level in the producing wellbore (e.g., expressed as hydrostatic fluid pressure).

Figure 32:
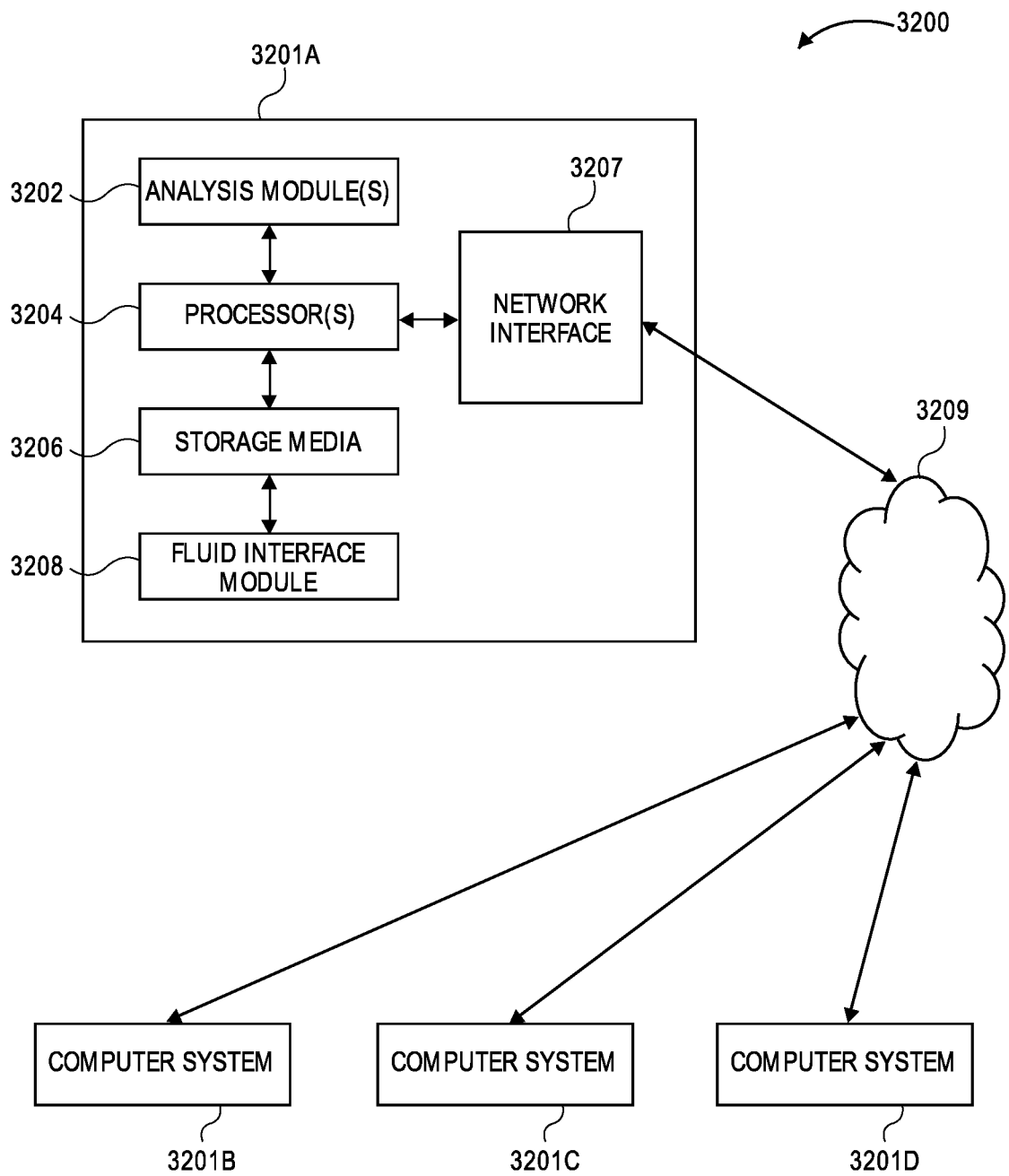
FIG. 32 illustrates an example of such a computing system, in accordance with some embodiments.

FIG. 32 illustrates an example of such a computing system 3200, in accordance with some embodiments. The computing system 3200 may include a computer or computer system 3201A, which may be an individual computer system 3201A or an arrangement of distributed computer systems. The computer system 3201A includes one or more analysis module(s) 3202 configured to perform various tasks according to some embodiments, such as one or more methods disclosed herein. To perform these various tasks, the analysis module 3202 executes independently, or in coordination with, one or more processors 3204, which is (or are) connected to one or more storage media 3206. The processor(s) 3204 is (or are) also connected to a network interface 3207 to allow the computer system 3201A to communicate over a data network 3209 with one or more additional computer systems and/or computing systems, such as 3201B, 3201C, and/or 3201D (note that computer systems 3201B, 3201C and/or 3201D may or may not share the same architecture as computer system 3201A, and may be located in different physical locations, e.g., computer systems 3201A and 3201B may be located in a processing facility, while in communication with one or more computer systems such as 3201C and/or 3201D that are located in one or more data centers, and/or located in varying countries on different continents).

A processor can include a microprocessor, microcontroller, processor module or subsystem, programmable integrated circuit, programmable gate array, or another control or computing device.

The storage media 3206 can be implemented as one or more computer-readable or machine-readable storage media. Note that while in the example embodiment of FIG. 32 storage media 3206 is depicted as within computer system 3201A, in some embodiments, storage media 3206 may be distributed within and/or across multiple internal and/or external enclosures of computing system 3201A and/or additional computing systems. Storage media 3206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices.

Note that the instructions discussed above can be provided on one computer-readable or machine-readable storage medium, or in another embodiment, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 3200 contains one or more fluid interface module(s) 3208. In the example of computing system 3200, computer system 3201A includes the fluid interface module 3208. In some embodiments, a single fluid interface module may be used to perform at least some aspects of one or more embodiments of the method 3100. In other embodiments, a plurality of fluid interface modules may be used to perform at least some aspects of the method 3100.

It should be appreciated that computing system 3200 is one example of a computing system, and that computing system 3200 may have more or fewer components than shown, may combine additional components not depicted in the example embodiment of FIG. 32, and/or computing system 3200 may have a different configuration or arrangement of the components depicted in FIG. 32. The various components shown in FIG. 32 may be implemented in hardware, software, or a combination of both hardware and software, including one or more signal processing and/or application specific integrated circuits.

Further, the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for monitoring movement of a fluid interface in a composite reservoir, comprising:

receiving data related to a composite reservoir, wherein the composite reservoir comprises an uninvaded oil zone, a water-invaded transition zone, and an aquifer;

generating a model using the data;

updating the model in response to movement of a fluid interface between the water-invaded transition zone and the uninvaded oil zone in the composite reservoir, the updating the model in response to the movement of the fluid interface further comprises:

discerning an onset of a fluid front movement based on evaluating a second derivative function of a pressure change in a wellbore with respect to time;

updating the model in response to movement of water from the aquifer toward the wellbore before the fluid interface reaches the wellbore formed in the composite reservoir; and determining a remedial action to take in the wellbore in response to the movement of the fluid interface, the movement of the water, or both.

2. The method of claim 1, wherein the data comprises a pressure in the wellbore as a function of time, and wherein the data is captured using a pressure gauge in the wellbore.

3. The method of claim 1, wherein the model comprises a Laplace transform finite difference numerical model that couples a Laplace transform finite-difference numerical technique with a frontal advance formula.

4. The method of claim 1, wherein the model comprises a pressure-transient response or a rate-transient response of the wellbore.

5. The method of claim 1, wherein updating the model in response to movement of the fluid interface comprises identifying a position of the fluid interface at any point in time and identifying a speed at which the fluid interface is approaching the wellbore.

6. The method of claim 1, wherein updating the model in response to movement of the water uses:

a pressure-transient response of the wellbore in the model; and a first derivative function of a pressure change in the wellbore with respect to time in the model.

7. The method of claim 1, wherein the remedial action comprises altering a drawdown at the wellbore in response to the movement of the fluid interface, the movement of the water, or both.

8. The method of claim 1, wherein the remedial action comprises pumping a material into the wellbore to slow encroachment of the water into the wellbore, wherein the material comprises a polymer, a cement, a chemical squeeze, or a combination thereof.

9. The method of claim 1, wherein the remedial action comprises closing a sliding sleeve in the wellbore or setting a plug in the wellbore, to isolate an interval of the wellbore proximate to the movement of the fluid interface or the movement of the water from other completed intervals in the wellbore.

10. The method of claim 1, wherein:

the wellbore comprises a horizontal wellbore, the composite reservoir comprises a cylindrical composite reservoir that includes a vertical fracture, and the model uses a hybrid combination of a linear flow formulation and a radial flow formulation.

11. A computing system, comprising:

one or more processors; and a memory system comprising one or more non-transitory computer-readable media storing instructions that, when executed by at least one of the one or more processors, cause the computer system to perform operations, the operations comprising:

receiving data related to a composite reservoir, wherein the composite reservoir comprises an uninvaded oil zone, a water-invaded transition zone, and an aquifer;

generating a model using the data;

updating the model in response to movement of a fluid interface between the water-invaded transition zone and the uninvaded oil zone in the composite reservoir, the updating the model in response to the movement of the fluid interface further comprises:
discerning an onset of a fluid front movement based on evaluating a second derivative function of a pressure change in a wellbore with respect to time;

updating the model in response to movement of water from the aquifer toward the wellbore before the fluid interface reaches the wellbore formed in the composite reservoir; and determining a remedial action to take in the wellbore in response to the movement of the fluid interface, the movement of the water, or both.

12. The computing system of claim 11, wherein the wellbore comprises an unfractured vertical wellbore, wherein the composite reservoir comprises a cylindrical composite reservoir, and wherein the model uses a radial flow formulation for flow in the composite reservoir.

13. The computing system of claim 11, wherein the wellbore comprises a vertical wellbore, wherein the composite reservoir comprises a vertical fracture that intersects the vertical wellbore, and wherein the model uses a linear flow formulation for flow in the composite reservoir.

14. The computing system of claim 11, wherein the wellbore comprises a horizontal wellbore, wherein the composite reservoir comprises a vertical fracture that intersects the horizontal wellbore, and wherein the model uses a linear flow formulation for flow in the composite reservoir to a plane of the vertical fracture, and wherein the model also uses a converging flow apparent steady state skin effect for converging flow within the vertical fracture to the horizontal wellbore.

15. The computing system of claim 11, wherein the wellbore comprises an unfractured horizontal wellbore, wherein the composite reservoir comprises a rectangular composite reservoir, and wherein the model uses a linear flow formulation for flow in the composite reservoir to a vertical plane including the horizontal wellbore, with an additional converging flow steady state skin effect to account for converging flow in the composite reservoir.

16. The computing system of claim 11, wherein the wellbore comprises a horizontal wellbore, wherein the composite reservoir comprises a cylindrical composite reservoir that includes a vertical fracture, and wherein the model uses a hybrid combination of a linear flow formulation and a radial flow formulation.

17. The computing system of claim 16, wherein the linear flow formulation is used in a plane of the vertical fracture and is solved analytically, the radial flow formulation is used adjacent to the plane of the vertical fracture or adjacent to the horizontal wellbore and is solved analytically, and the radial flow formulation is used beyond tips of the vertical fracture or the horizontal wellbore and is solved numerically.

18. The computing system of claim 11, wherein, when the wellbore is substantially vertical, there is a dip in a derivative signature in the model at ½ log cycle in time prior to breakthrough.

19. The computing system of claim 11, wherein the remedial action comprises closing a sliding sleeve in the wellbore or setting a plug in the wellbore, to isolate an interval of the wellbore proximate to the movement of the fluid interface or the movement of the water from other completed intervals in the wellbore.

20. A non-transitory computer-readable media storing instructions that, when executed by one or more processors of a computer system, cause the computer system to perform operations, the operations comprising:

receiving data related to a composite reservoir, wherein the composite reservoir comprises an uninvaded oil zone, a water-invaded transition zone, and an aquifer;

generating a model using the data;

updating the model in response to movement of a fluid interface between the water-invaded transition zone and the uninvaded oil zone in the composite reservoir, the updating the model in response to the movement of the fluid interface further comprises:
discerning an onset of a fluid front movement based on evaluating a second derivative function of a pressure change in a wellbore with respect to time;

updating the model in response to movement of water from the aquifer toward the wellbore before the fluid interface reaches the wellbore formed in the composite reservoir; and determining a remedial action to take in the wellbore in response to the movement of the fluid interface, the movement of the water, or both.

* * * * *